US012432581B2

United States Patent
Goto et al.

(10) Patent No.: US 12,432,581 B2
(45) Date of Patent: Sep. 30, 2025

(54) WIRELESS COMMUNICATION SYSTEM, COMMUNICATION APPARATUS, RELAY APPARATUS, COMMUNICATION TIMING DETERMINATION METHOD AND COMPUTER PROGRAM

(71) Applicant: NTT, Inc., Tokyo (JP)

(72) Inventors: Daisuke Goto, Musashino (JP); Kiyohiko Itokawa, Musashino (JP); Yasuyoshi Kojima, Musashino (JP); Fumihiro Yamashita, Musashino (JP)

(73) Assignee: NTT, Inc., Tokyo (JP)

( * ) Notice: Subject to any disclaimer, the term of this patent is extended or adjusted under 35 U.S.C. 154(b) by 403 days.

(21) Appl. No.: 17/928,458

(22) PCT Filed: Jun. 5, 2020

(86) PCT No.: PCT/JP2020/022322
§ 371 (c)(1),
(2) Date: Nov. 29, 2022

(87) PCT Pub. No.: WO2021/245913
PCT Pub. Date: Dec. 9, 2021

(65) Prior Publication Data
US 2023/0217275 A1    Jul. 6, 2023

(51) Int. Cl.
*H04W 24/06* (2009.01)
*H04W 84/06* (2009.01)
(52) U.S. Cl.
CPC ............ *H04W 24/06* (2013.01); *H04W 84/06* (2013.01)
(58) Field of Classification Search
CPC .............................. H04W 24/06; H04W 84/06
See application file for complete search history.

(56) References Cited

U.S. PATENT DOCUMENTS 6,417,781 B1      7/2002  Matsumoto
9,461,905 B2 *  10/2016  Schrecke ................ H04L 1/205
(Continued)

FOREIGN PATENT DOCUMENTS

JP         2001109989 A    4/2001
JP         2002-232432 A   8/2002
(Continued)

OTHER PUBLICATIONS

Daichi Kominami et al., "Self-organized transmission scheduling for LPWA networks considering gateway load balancing", Technical Report of IEICE, the Institute of Electronics, Information and Communication Engineers, vol. 117, No. 353, IN2017-67, pp. 127-132, Dec. 2017.

*Primary Examiner* — Mounir Moutaouakil
(74) *Attorney, Agent, or Firm* — Harness, Dickey & Pierce, P.L.C.

(57) ABSTRACT

In a wireless communication system in which a relay device provided on a mobile object communicates wirelessly with a plurality of communication devices present in places different from each other, each of the communication devices includes a communication device transmission unit which transmits test signals at a plurality of timings during a time frame when communication with the relay device is possible, a communication device reception unit which receives, from the relay device, communication situation information indicating communication situations at the plurality of timings, and a communication device control unit which controls the communication device transmission unit such that the communication device transmission unit communicates with the relay device at one of the plurality of timings, the communication situation of which is good and which is identified on the basis of the communication situation information, and the relay device includes a relay device reception unit which receives the respective test (Continued)

signals at the plurality of timings, a measurement unit which measures the respective communication situations at the time of reception of the test signals at the plurality of timings, a relay device control unit which generates the communication situation information on the basis of the communication situations, and a relay device transmission unit which transmits the communication situation information to the communication device during a time frame when communication with the communication device is possible.

3 Claims, 14 Drawing Sheets

(56) References Cited

U.S. PATENT DOCUMENTS

| | | | |
|---|---|---|---|
| 11,882,459 B2 * | 1/2024 | Keaton | H04W 24/02 |
| 2005/0107080 A1 * | 5/2005 | Hasegawa | H04W 24/00 |
| | | | 455/423 |
| 2015/0138990 A1 * | 5/2015 | Minezawa | H04B 17/29 |
| | | | 370/241 |
| 2021/0006984 A1 * | 1/2021 | Keaton | H04W 24/02 |

FOREIGN PATENT DOCUMENTS

| | | |
|---|---|---|
| JP | 2012-253652 A | 12/2012 |
| JP | 2014204177 A | 10/2014 |
| JP | 2019047262 A | 3/2019 |

* cited by examiner

WIRELESS COMMUNICATION SYSTEM, COMMUNICATION APPARATUS, RELAY APPARATUS, COMMUNICATION TIMING DETERMINATION METHOD AND COMPUTER PROGRAM

CROSS-REFERENCE TO RELATED APPLICATIONS

This application is a 371 U.S. National Phase of International Application No. PCT/JP2020/022322, filed on Jun. 5, 2020. The entire disclosure of the above application is incorporated herein by reference.

TECHNICAL FIELD

The present invention relates to a wireless communication system, a communication apparatus, a relay apparatus, a communication timing determination method and a computer program.

BACKGROUND ART

IoT (Internet of Things) systems which implement various applications by connecting small-sized terminal devices to the Internet are in widespread use. As an application of an IoT system, there is known a system in which a plurality of IoT terminals sense pieces of environmental information, such as air temperature, room temperature, acceleration, and light intensity, and transmits the pieces of environmental information by means of wireless signals, and a cloud side collects the pieces of environmental information. IoT terminals provided with various sensors are installed in various places. For example, utilization of IoT to collect data in a place where a base station is hard to install, such as a buoy or a ship on the sea or a mountainous area, is also conceivable.

There is available a wireless system which uses a communication satellite, a UAV (Unmanned Aerial Vehicle), or the like as a relay station to perform wireless communication between a plurality of communication devices on the ground. Wireless systems which uses a communication satellite as a relay station include one using a low earth orbit satellite (LEO: Low Earth Orbit) which travels in a low orbit at an altitude of around 1,000 km and one using a geostationary satellite (GEO: Geostationary Orbit) which orbits at an altitude of 36,000 km. A low earth orbit satellite is shorter in propagated distance than a geostationary satellite. For this reason, if a low earth orbit satellite is used as a relay station, low-delay and low-propagation-loss communication can be implemented. In this case, a configuration of a high-frequency circuit which the low earth orbit satellite or a communication device on the ground includes is simpler. However, since a low earth orbit satellite orbits above the earth, unlike a geostationary satellite, a direction of the satellite as viewed from a communication device on the ground changes constantly. A visible time period of the low earth orbit satellite for each communication device on the ground per orbital revolution is several minutes. For this reason, a time frame when communication between the low earth orbit satellite and each communication device on the ground is possible is limited.

As a wireless system capable of wide-area communication with low power and at a low transmission rate suitable for IoT terminal communication, LPWA (Low Power Wide Area) is known. Nowadays, a satellite IoT system in which a communication satellite uses LPWA to collect data from an IoT terminal is under consideration. Generally, wireless communication between a communication satellite and a communication device on the ground is longer in propagated distance than wireless communication that is direct communication between a plurality of communication devices on the ground. However, use of a low earth orbit satellite allows application of LPWA. This satellite IoT system allows housing of an IoT terminal in the field of aviation, in the field of ships, and in a rural area, which is hard to implement only with normal LPWA. Since this case does not need a hub station, service deployment is easier.

The number of IoT terminals is on the rise these days. Since LPWA has a low data rate, a time period for which an IoT terminal transmits data is longer. For this reason, there is fear that collisions between data packets increase with increase in the number of IoT terminals. To cope with this, a method that avoids a collision at the time of data reception in a base station by autonomous distributed transmission schedule control of a terminal in an LPWA network is described in, for example, Non-Patent Literature 1. In the method described in Patent Literature 1, transmission timings of each terminal are represented by a phase oscillator model. When data to be transmitted occurs, each terminal performs transmission after waiting until a phase of the terminal reaches 0. The method avoids a data collision by implementing an anti-phase synchronization state where phases of all terminals are evenly spaced from each other.

CITATION LIST

Non-Patent Literature

Non-Patent Literature 1: Daichi Kominami, Ikkyu Aihara, and Masayuki Murata, "Self-organized transmission scheduling for LPWA networks considering gateway load balancing," IEICE Technical Report, vol. 117 no. 353 IN2017-67, pp. 127-132, December 2017

SUMMARY OF THE INVENTION

Technical Problem

In an IoT system, each IoT terminal may repeat data transmission to a base station a plurality of times in order to ensure communication reliability. Since a large number of IoT terminals transmit data, transmission opportunities exceeding the number of slots may occur. As described above, in the IoT system, the degree of communication congestion may vary from time to time. However, in the method described in Non-Patent Literature 1, terminals transmit data at respective timings different from each other given to the terminals without exception.

The method described in Non-Patent Literature 1 is based on the assumption that a position of a base station which is to communicate with a terminal is a fixed position. For this reason, in the method described in Non-Patent Literature 1, for example, if a communication station which is to communicate with a terminal is provided on a mobile object which moves periodically, it is difficult to determine an efficient transmission timing in data transmission from a terminal to the communication station. This is because an appropriate transmission timing in data transmission from a terminal station to the communication station is different for a positional relationship between each terminal and the communication station, the volume of communication for the terminal, and the like. Thus, the method described in Non-Patent Literature 1 suffers from a situation where a failure to transmit data at an efficient transmission timing may occur to cause a data collision and reduction in communication reliability.

In view of the above-described circumstances, the present invention has as its object to provide a wireless communication system, a communication apparatus, a relay apparatus, a communication timing determination method and a computer program capable of curbing reduction in communication reliability.

Means for Solving the Problem

One aspect of the present invention is a wireless communication system in which a relay device provided on a mobile object communicates wirelessly with a plurality of communication devices present in places different from each other, each of the communication devices includes a communication device transmission unit which transmits test signals at a plurality of timings during a time frame when communication with the relay device is possible, a communication device reception unit which receives, from the relay device, communication situation information indicating respective communication situations with the relay device at the plurality of timings, and a communication device control unit which identifies one, the communication situation of which is good, among the plurality of timings on the basis of the communication situation information and controls the communication device transmission unit such that the communication device transmission unit communicates with the relay device at the identified timing with the good communication situation, and the relay device includes a relay device reception unit which receives the respective test signals transmitted from the communication device at the plurality of timings, a measurement unit which measures the respective communication situations at the time of reception of the test signals at the plurality of timings by the relay device reception unit, a relay device control unit which generates the communication situation information on the basis of the communication situations measured by the measurement unit, and a relay device transmission unit which transmits the communication situation information to the communication device during a time frame when communication with the communication device is possible.

One aspect of the present invention is a communication device in a wireless communication system in which a relay device provided on a mobile object communicates wirelessly with a plurality of communication devices present in places different from each other, the communication device being one of the plurality of communication devices, including a transmission unit which transmits test signals at a plurality of timings during a time frame when communication with the relay device is possible, a reception unit which receives, from the relay device, communication situation information indicating respective communication situations with the relay device at the plurality of timings, and a control unit which identifies one, the communication situation of which is good, among the plurality of timings on the basis of the communication situation information and controls the transmission unit such that the transmission unit communicates with the relay device at the identified timing with the good communication situation.

One aspect of the present invention is a relay device in a wireless communication system in which the relay device provided on a mobile object communicates wirelessly with a plurality of communication devices present in places different from each other, including a reception unit which receives, at a plurality of timings during a time frame when communication with each of the communication devices is possible, respective test signals transmitted from the communication device at the plurality of timings, a measurement unit which measures respective communication situations at the time of reception of the test signals at the plurality of timings by the reception unit, a control unit which generates communication situation information indicating the communication situations measured by the measurement unit, and a transmission unit which transmits the communication situation information to the communication device during the time frame when communication with the communication device is possible.

One aspect of the present invention is a communication timing determination method in a wireless communication system in which a relay device provided on a mobile object communicates wirelessly with a plurality of communication devices present in places different from each other, including a communication device transmission step of, by each of the communication devices, transmitting test signals at a plurality of timings during a time frame when communication with the relay device is possible, a relay device reception step of, by the relay device, receiving the respective test signals transmitted from the communication device at the plurality of timings, a measurement step of, by the relay device, measuring respective communication situations at the time of reception of the test signals at the plurality of timings, a relay device control step of, by the relay device, generating communication situation information indicating the respective communication situations with the relay device at the plurality of timings on the basis of the communication situations, a relay device transmission step of, by the relay device, transmitting the communication situation information to the communication device during a time frame when communication with the communication device is possible, a communication device reception step of, by the communication device, receiving the communication situation information, and a communication device control step of, by the communication device, identifying one, the communication situation of which is good, among the plurality of timings on the basis of the communication situation information and controlling a communication device transmission unit such that the communication device transmission unit communicates with the relay device at the identified timing with the good communication situation.

One aspect of the present invention is a communication timing determination method in a wireless communication system in which a relay device provided on a mobile object communicates wirelessly with a plurality of communication devices present in places different from each other, including a transmission step of, by each of the communication devices, transmitting test signals at a plurality of timings during a time frame when communication with the relay device is possible, a reception step of, by the communication device, receiving, from the relay device, communication situation information indicating respective communication situations with the relay device at the plurality of timings, and a control step of, by the communication device, identifying one, the communication situation of which is good, among the plurality of timings on the basis of the communication situation information and controlling a communication device transmission unit such that the communication device transmission unit communicates with the relay device at the identified timing with the good communication situation.

One aspect of the present invention is a communication timing determination method in a wireless communication system in which a relay device provided on a mobile object communicates wirelessly with a plurality of communication devices present in places different from each other, including a reception step of, by the relay device, receiving, at a plurality of timings during a time frame when communication with each of the communication devices is possible, respective test signals transmitted from the communication device at the plurality of timings, a measurement step of, by the relay device, measuring respective communication situations at the time of reception of the test signals at the plurality of timings, a control unit of, by the relay device, generating communication situation information indicating the measured communication situations, the communication situation information being for the communication device to determine one of the plurality of timings, the communication situation of which is good, as a timing to communicate with the relay device, and a transmission step of, by the relay device, transmitting the communication situation information to the communication device during the time frame when communication with the communication device is possible.

One aspect of the present invention is a computer program for causing a computer to function as the above-described communication device.

One aspect of the present invention is a computer program for causing a computer to function as the above-described relay device.

Effects of the Invention

According to the present invention, it is possible to curb reduction in communication reliability.

DESCRIPTION OF EMBODIMENTS

Embodiments of the present invention will be described in detail below with reference to the drawings.

First Embodiment

Figure 1:
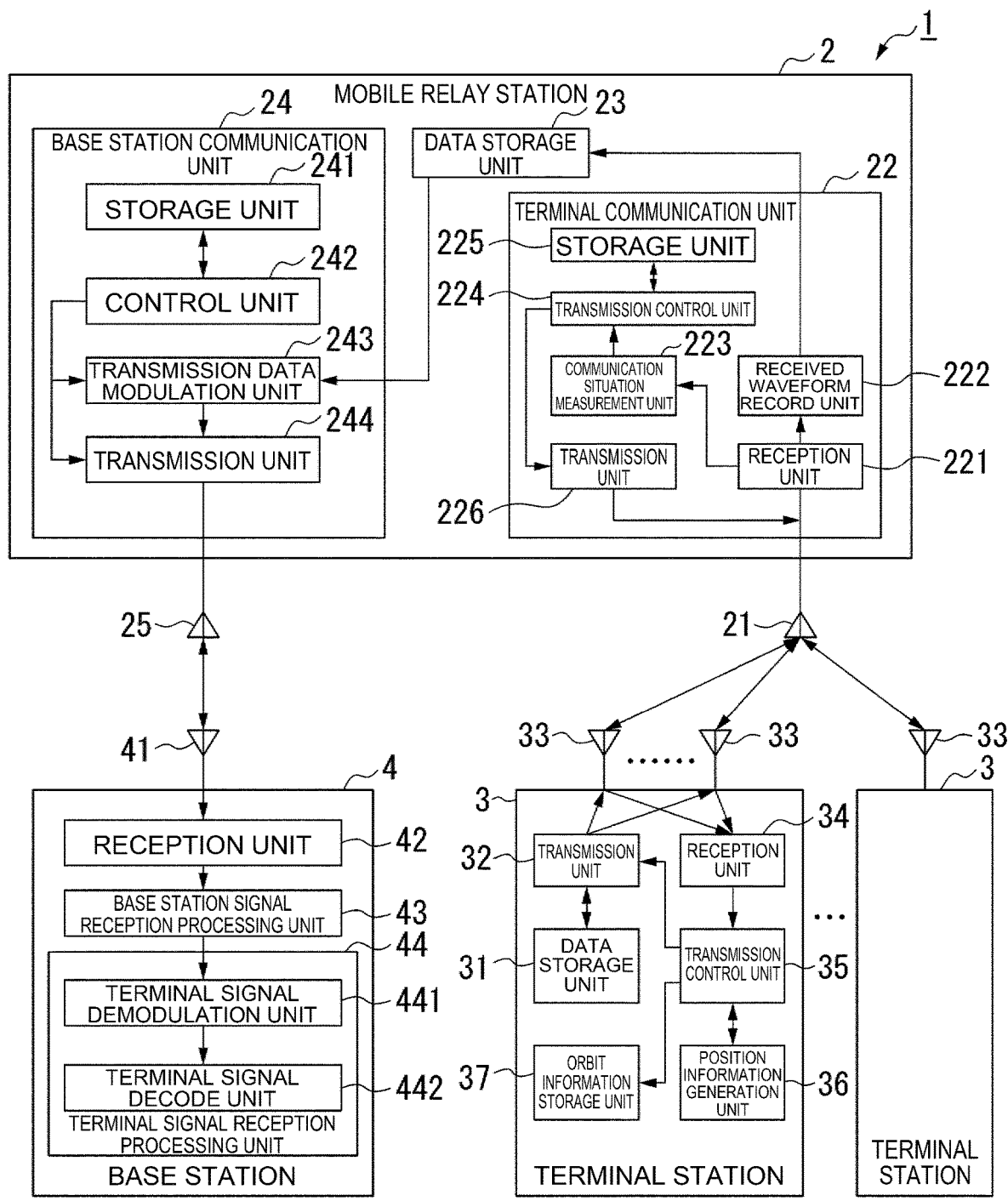
FIG. 1 is a diagram of a configuration of a wireless communication system according to a first embodiment of the present invention.

FIG. 1 is a diagram of a configuration of a wireless communication system 1 according to a first embodiment. The wireless communication system 1 has a mobile relay station 2 (relay apparatus), a terminal station 3 (communication apparatus), and a base station 4. The respective numbers of mobile relay stations 2, terminal stations 3, and base stations 4 which the wireless communication system 1 has are arbitrary. The number of terminal stations 3 is assumed to be large. The wireless communication system 1 is a communication system which performs transmission of information not requiring immediacy. Respective pieces of information transmitted from a plurality of terminal stations 3 are transmitted via the mobile relay station 2 and are collected by the base station 4.

The mobile relay station 2 is an example of a relay device (apparatus), which is mounted on a mobile object and a communication-enabled area for which moves over time. The mobile relay station 2 is provided on, for example, a LEO (Low Earth Orbit) satellite. The LEO satellite has an altitude of 2,000 km or lower and orbits above the earth with a period of about 1.5 hours. The terminal stations 3 and the base station 4 are installed on the earth, such as on the ground or on the sea. The plurality of terminal stations 3 are present in places different from each other. Each terminal station 3 is, for example, an IoT terminal. The terminal station 3 collects data, such as environmental data detected by a sensor, and wirelessly transmits the data to the mobile relay station 2. In FIG. 1, only two terminal stations 3 are shown. The mobile relay station 2 receives respective pieces of data transmitted from the plurality of terminal stations 3 by means of wireless signals while moving above the earth. The mobile relay station 2 accumulates the received pieces of data and collectively and wirelessly transmits accumulated data to the base station 4 at a timing when communication with the base station 4 is possible. The base station 4 receives, from the mobile relay station 2, the data collected by the terminal stations 3.

Use of a relay station mounted on a geostationary satellite or an unmanned air vehicle, such as a drone or a HAPS (High Altitude Platform Station), as the mobile relay station 2 is conceivable. However, in the case of a relay station mounted on a geostationary satellite, although a cover area (footprint) on the ground is large, a link budget for an IoT terminal installed on the ground is very low due to a high altitude. In the case of a relay station mounted on a drone or a HAPS, a link budget is high while a cover area is small. Additionally, a drone requires a battery, and a HAPS requires a solar panel. In the present embodiment, since the mobile relay station 2 is mounted on the LEO satellite, a link budget falls within limits. In addition to this, the LEO satellite orbits above the atmosphere and has no resistance to air, and consumes less fuel. The LEO satellite has a larger footprint than in the case where the relay station is mounted on the drone or HAPS.

Since the mobile relay station 2 mounted on the LEO satellite performs communication while moving at high speed, the individual terminal station 3 or the base station 4 has a limited amount of time to communicate with the mobile relay station 2. Specifically, the mobile relay station 2 passes across the sky in about 10 minutes when viewed from the ground. Various types of wireless communication systems are used for the terminal station 3. For this reason, the mobile relay station 2 receives a terminal uplink signal from the terminal station 3 within coverage for a current position during movement and keeps waveform data of the received terminal uplink signal. The mobile relay station 2 wirelessly transmits a base station downlink signal having the waveform data of the terminal uplink signal set therein to the base station 4 at a timing when the base station 4 is present in coverage. The base station 4 demodulates the base station downlink signal received from the mobile relay station 2 and obtains the waveform data of the terminal uplink signal. The base station 4 obtains terminal transmission data which is data transmitted by the terminal station 3 by demodulating and decoding the terminal uplink signal indicated by the waveform data.

Note that the wireless communication system 1 according to the present embodiment is configured such that the mobile relay station 2 and the terminal station 3 perform wireless communication using LPWA (Low Power Wide Area). As described earlier, the number of terminal stations 3 is assumed to be large. Note that each terminal station 3 may be configured to transmit the same terminal uplink signal toward the mobile relay station 2 a plurality of times in order to ensure communication reliability.

With the above-described configuration, if a transmission timing for a terminal uplink signal to be transmitted from the terminal station 3 to the mobile relay station 2 is not controlled, overlap between transmission timings for respective terminal uplink signals transmitted from the plurality of terminal stations 3 temporarily increases the volume of communication in the mobile relay station 2. This may cause a communication bandwidth shortage. The wireless communication system 1 according to the present embodiment identifies respective appropriate timings when transmission of terminal uplink signals from the terminal stations 3 to the mobile relay station 2 is executed in order to prevent a communication bandwidth shortage.

A process for determining a timing when transmission of a terminal uplink signal is executed in each terminal station 3 will be referred to as a "transmission execution timing determination process" hereinafter. A timing determined by the transmission execution timing determination process will be referred to as a "transmission execution timing."

The transmission execution timing determination process is executed, for example, at the time of initial activation of the wireless communication system 1 or at the time of initial activation of the terminal station 3. Note that the transmission execution timing determination process may be executed periodically (e.g., at intervals of one day or one month). For example, if the terminal station 3 is provided on, e.g., a mobile object which moves periodically on the ground or on the sea (that may be generically referred to as "on the ground" hereinafter), an appropriate transmission execution timing for a terminal uplink signal changes. Thus, in this case, the transmission execution timing determination process is desirably executed each time a position of the terminal station 3 moves.

The transmission execution timing determination process will be specifically described below.

Each terminal station 3 stores in advance orbit information indicating an orbit of the mobile relay station 2. Each terminal station 3 can recognize the position of itself and a current time. For example, the terminal station 3 includes a positioning device, such as a GPS (Global Positioning System) receiver, and can identify the position of itself and the current time. As described earlier, the mobile relay station 2 mounted on the LEO satellite performs communication while moving at high speed. For this reason, a time frame when the individual terminal station 3 can communicate with the mobile relay station 2 (hereinafter referred to as a "communication-enabled time frame") is limited. The terminal station 3 identifies a communication-enabled time frame on the basis of the orbit information and the position of itself.

During one communication-enabled time frame which comes during each orbital revolution of the mobile relay station 2, a communication situation between the mobile relay station 2 and the terminal station 3 changes. That is, in one communication-enabled time frame, a transmission timing with a better communication situation and a transmission timing with a poorer communication situation are present. This arises from, for example, a positional relationship between the mobile relay station 2 and the terminal station 3. For example, a transmission timing when a distance between the mobile relay station 2 and the terminal station 3 is shorter is more likely to have a better communication situation. For example, a transmission timing with a positional relationship in which a shielding object (e.g., a building) is present between the mobile relay station 2 and the terminal station 3 is more likely to have a poorer communication situation.

For example, a transmission timing when different terminal stations 3 which communicate with the same mobile relay station 2 are present close to the terminal station 3, and the different terminal stations 3 transmit terminal uplink signals to the mobile relay station 2 is more likely to have a poorer communication situation. As described above, a communication situation fluctuates with a transmission timing during one communication-enabled time frame, due to an ambient environment of the terminal station 3 and the like.

The transmission execution timing determination process is a process for determining a transmission execution timing such that each terminal station 3 can continuously transmit a terminal uplink signal to the mobile relay station 2 at a timing with a good communication situation during a communication-enabled time frame.

The wireless communication system 1 according to the present embodiment identifies, for each terminal station 3, a transmission timing with a good communication situation during a communication-enabled time frame. In the transmission execution timing determination process, the terminal station 3 first transmits a terminal uplink signal (hereinafter referred to as a "test signal") including information representing a transmission test toward the mobile relay station 2 at predetermined intervals (e.g., every one minute) during a communication-enabled time frame.

Figure 2:
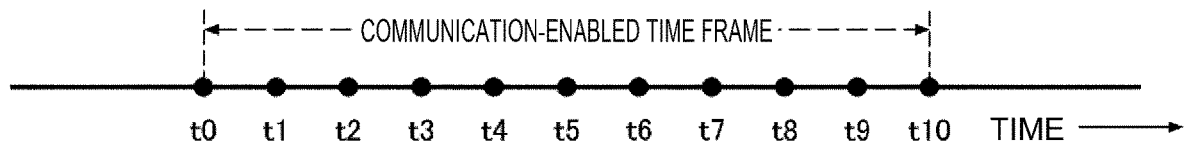
FIG. 2 is a schematic chart showing transmission timings for a test signal to be transmitted from a terminal station according to the first embodiment of the present invention.

FIG. 2 is a schematic chart showing transmission timings for a test signal to be transmitted from the terminal station 3. In FIG. 2, the abscissa represents time. Times t0 to t10 each represent a timing when a test signal is transmitted from the terminal station 3 to the mobile relay station 2. For example, if a communication-enabled time frame is 10 minutes long, and a test signal is transmitted at intervals of one minute, a total of 11 test signals are transmitted from the terminal station 3 to the mobile relay station 2. In this case, the time t0 is a start time of the communication-enabled time frame, and the times t1 to t10 are a time point after a lapse of one minute since the time t0, . . . , and a time point after a lapse of 10 minutes since the time t0, respectively.

Note that although the terminal station 3 is configured to transmit a test signal at predetermined intervals (e.g., every one minute) in the present embodiment, the present invention is not limited to this. For example, a configuration may be adopted in which the number of times (e.g., 10) a test signal is transmitted during one communication-enabled time frame is determined in advance, and a predetermined number of test signals are transmitted, for example, at equal intervals during a communication-enabled time frame.

Technically, there is a time gap corresponding to a transmission time period between a time when the terminal station 3 transmits a test signal and a time when the mobile relay station 2 receives the test signal. However, the transmission time period is a very short time period compared with a transmission interval for a test signal. Thus, the following description will be given based on the assumption that a time when the terminal station 3 transmits a test signal and a time when the mobile relay station 2 receives the test signal are identical.

A test signal transmitted from the terminal station 3 to the mobile relay station 2 includes, for example, identification information for identification of the terminal station 3. If the mobile relay station 2 receives a test signal transmitted from the terminal station 3, the mobile relay station 2 measures the degree of communication congestion. The degree of communication congestion refers to, for example, a degree represented by the number of terminal uplink communication accesses per unit time from the plurality of terminal stations 3 or RSSI (Received Signal Strength Indicator) in a terminal uplink communication frequency band in the mobile relay station 2. Note that any index may be adopted as an index used as the degree of communication congestion as long as the index can quantitatively indicate the degree of communication bandwidth shortage in the mobile relay station 2.

The mobile relay station 2 determines a communication situation on the basis of the measured degree of communication congestion. For example, the mobile relay station 2 determines that the communication situation is good if RSSI is not less than a predetermined threshold and determines that the communication situation is poor if the RSSI is less than the predetermined threshold. The mobile relay station 2 transmits, toward the ground, a terminal downlink signal having information indicating a determination result and the identification information for identification of the terminal station 3 included in a received test signal (hereinafter referred to as "communication situation information") set therein. Information indicating a determination result refers to, for example, information indicating a transmission timing (e.g., a time) which is determined to have a good communication situation. The mobile relay station 2 transmits the terminal downlink signal toward the ground, for example, during a next orbital revolution (when the mobile relay station 2 passes across the sky above the target terminal station 3 next time).

Figure 3:
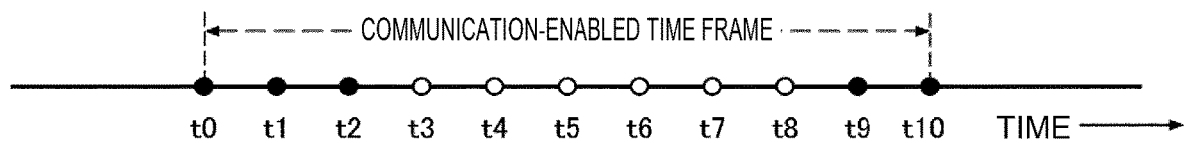
FIG. 3 is a schematic chart showing an example of a result of determining respective communication situations for the transmission timings shown in FIG. 2.

FIG. 3 is a schematic chart showing an example of a result of determining respective communication situations for the transmission timings shown in FIG. 2. In FIG. 3, a white circle indicates a transmission timing which is determined to have a good communication situation while a black circle indicates a transmission timing which is determined to have a poor communication situation. That is, FIG. 3 indicates that a communication situation is determined to be good in reception of each of test signals transmitted at six transmission timings at the times t3 to t8 of a total of 11 test signals received by the mobile relay station 2 from the time t0 to the time t10.

The mobile relay station 2 sets, for example, information indicating the times t3 to t8 and the identification information for identification of the terminal station 3 included in the received test signals in a terminal downlink signal and transmits the terminal downlink signal toward the ground.

The terminal station 3 after reception of a terminal downlink signal checks identification information included in the terminal downlink signal against the identification information for identification of itself. If the identification information included in the terminal downlink signal is identical to the identification information for identification of itself (i.e., if the terminal downlink signal is a terminal downlink signal transmitted toward itself), the terminal station 3 acquires communication situation information included in the terminal downlink signal. The terminal station 3 determines a transmission execution timing to execute transmission of a terminal uplink signal to the mobile relay station 2 on the basis of the communication situation information. After that, the terminal station 3 transmits a terminal uplink signal having terminal transmission data, such as environmental data, set therein to the mobile relay station 2 at the determined transmission execution timing each time the mobile relay station 2 makes an orbital revolution.

In the present embodiment, for example, if the terminal station 3 acquires communication situation information indicating that communication situations at the times t3 to t8 are good, as shown in FIG. 3, the terminal station 3 selects any time from among the times t3 to t8 and sets the selected time as a transmission execution timing.

Note that the terminal station 3 may randomly select a transmission execution timing from among a plurality of (six in FIG. 3) transmission timings indicated by communication situation information. Alternatively, for example, the terminal station 3 may set, as a transmission execution timing, a timing after a lapse of a random time period since an earliest transmission timing among the plurality of transmission timings indicated by the communication situation information. As described above, a transmission execution timing is randomly determined within a time frame which is determined to have a good communication situation. This allows avoidance of, for example, a situation where the plurality of terminal stations 3 simultaneously transmit terminal uplink signals to the mobile relay station 2 if the plurality of terminal stations 3 are present at positions close to each other. Thus, the degree of communication congestion in the mobile relay station 2 can be reduced.

Note that details of configurations and operation of the devices in the transmission execution timing determination process will be described later. First, details of configurations and operation of the devices in a process (hereinafter referred to as a "data collection process") for the base station 4 to collect terminal transmission data, such as environmental data, transmitted from each terminal station 3 via the mobile relay station 2 will be described below.

(Data Collection Process)

The configurations of the devices in the data collection process will be described.

As shown in FIG. 1, the mobile relay station 2 includes an antenna 21, a terminal communication unit 22, a data storage unit 23, a base station communication unit 24, and an antenna 25.

The terminal communication unit 22 has a reception unit 221 (relay device receiver) and a received waveform record unit 222. The reception unit 221 receives a terminal uplink signal with the antenna 21. The received waveform record unit 222 samples a received waveform of the terminal uplink signal received by the reception unit 221 and generates waveform data indicating a value obtained by the sampling. The received waveform record unit 222 writes, in the data storage unit 23, received waveform information having a reception time of the terminal uplink signal in the antenna 21 and the generated waveform data set therein. The data storage unit 23 stores the received waveform information written by the received waveform record unit 222.

The base station communication unit 24 transmits received waveform information to the base station 4 by means of a base station downlink signal based on an arbitrary wireless communication system. The base station communication unit 24 includes a storage unit 241, a control unit 242, a transmission data modulation unit 243, and a transmission unit 244. The storage unit 241 stores a transmission start timing calculated in advance on the basis of orbit information of the LEO satellite, on which the mobile relay station 2 is mounted, and a position of the base station 4. The orbit information of the LEO is information from which a position, a speed, a movement direction, and the like of the LEO satellite at an arbitrary time can be obtained. A transmission time may be represented by, for example, an elapsed time period since the transmission start timing.

The control unit 242 controls the transmission data modulation unit 243 and the transmission unit 244 such that the transmission data modulation unit 243 and the transmission unit 244 transmit received waveform information to the base station 4 at a transmission start timing stored in the storage unit 241. The transmission data modulation unit 243 reads out the received waveform information as transmission data from the data storage unit 23, and modulates the read-out transmission data and generates a base station downlink signal. The transmission unit 244 converts the base station downlink signal from an electric signal into a wireless signal and transmits the base station downlink signal from the antenna 25.

The terminal station 3 includes a data storage unit 31, a transmission unit 32 (communication device transmitter), and one or a plurality of antennas 33. The data storage unit 31 stores sensor data and the like. The transmission unit 32 reads out sensor data as terminal transmission data from the data storage unit 31 and wirelessly transmits a terminal uplink signal having the read-out terminal transmission data set therein from the antenna(s) 33.

The transmission unit 32 transmits a signal by LPWA (Low Power Wide Area). Although LPWA includes LoRaWAN®, Sigfox®, LTE-M (Long Term Evolution for Machines), and NB-IoT (Narrow Band IoT), an arbitrary wireless communication system can be used. The transmission unit 32 may perform transmission through time-division multiplexing, OFDM (Orthogonal Frequency Division Multiplexing), or the like together with the different terminal stations 3.

The transmission unit 32 determines a channel and a transmission timing to be used by the terminal station 3 to transmit a terminal uplink signal by a method determined in advance in a wireless communication system to be used. The transmission unit 32 may form a signal beam to be transmitted from the plurality of antennas 33 by the method determined in advance in the wireless communication system to be used.

The base station 4 includes an antenna 41, a reception unit 42, a base station signal reception processing unit 43, and a terminal signal reception processing unit 44. The reception unit 42 converts a base station downlink signal received by the antenna 41 into an electric signal. The base station signal reception processing unit 43 demodulates and decodes the received signal converted into the electric signal by the reception unit 42 and obtains received waveform information. The base station signal reception processing unit 43 outputs the received waveform information to the terminal signal reception processing unit 44.

The terminal signal reception processing unit 44 performs a process of receiving a terminal uplink signal indicated by received waveform information. At this time, the terminal signal reception processing unit 44 performs the reception process by a wireless communication system used by the terminal station 3 for transmission and acquires terminal transmission data. The terminal signal reception processing unit 44 includes a terminal signal demodulation unit 441 and a terminal signal decode unit 442.

The terminal signal demodulation unit 441 demodulates waveform data and outputs a symbol obtained through the demodulation to the terminal signal decode unit 442. The terminal signal demodulation unit 441 may perform demodulation after performing a process of compensating for a Doppler shift of a terminal uplink signal received by the antenna 21 of the mobile relay station 2 on a signal indicated by the waveform data. A Doppler shift which a terminal uplink signal received by the antenna 21 is to undergo is calculated in advance on the basis of the position of the terminal station 3 and the orbit information of the LEO, on which the mobile relay station 2 is mounted. The terminal signal decode unit 442 decodes the symbol obtained through the demodulation by the terminal signal demodulation unit 441 and obtains terminal transmission data transmitted from the terminal station 3.

Operation of the wireless communication system 1 in the data collection process will be described below.

Figure 4:
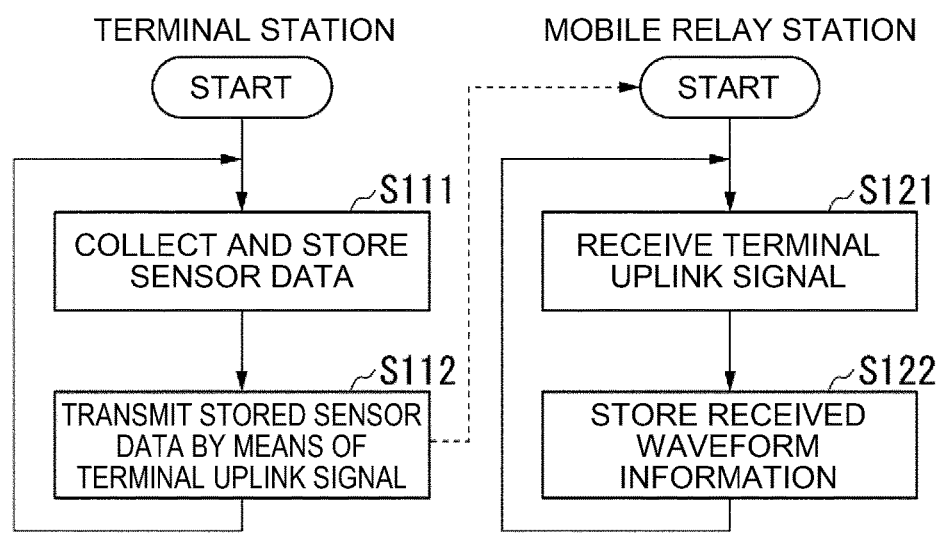
FIG. 4 is a flowchart showing a data collection process of the wireless communication system according to the embodiment.

FIG. 4 is a flowchart showing a process of the wireless communication system 1 in a case where a terminal uplink signal is transmitted from the terminal station 3 to the mobile relay station 2.

The terminal station 3 acquires sensor data (e.g., environmental data) detected by a sensor (not shown) provided outside or inside the terminal station 3 on an as-needed basis and writes the acquired sensor data in the data storage unit 31 (step S111). The transmission unit 32 reads out the sensor data as terminal transmission data from the data storage unit 31. The transmission unit 32 wirelessly transmits a terminal uplink signal having the terminal transmission data set therein from the antenna(s) 33 at a transmission start timing which is obtained in advance on the basis of the orbit information of the LEO satellite, on which the mobile relay station 2 is mounted (step S112). The terminal station 3 repeats the processes from step S111 onward. Note that the transmission start timing is a transmission execution timing determined by the transmission execution timing determination process.

The reception unit 221 of the mobile relay station 2 receives the terminal uplink signal transmitted from the terminal station 3 (step S121). Depending on a wireless communication system of the terminal station 3 as a transmission source, the reception unit 221 may receive a terminal uplink signal only from the one terminal station 3 on the same frequency in a time-shared manner or may receive terminal uplink signals simultaneously from a plurality of terminal stations 3 on the same frequency. The received waveform record unit 222 writes, in the data storage unit 23, received waveform information in which waveform data representing a waveform of the terminal uplink signal received by the reception unit 221 is associated with a reception time (step S122). The mobile relay station 2 repeats the processes from step S121 onward.

Figure 5:
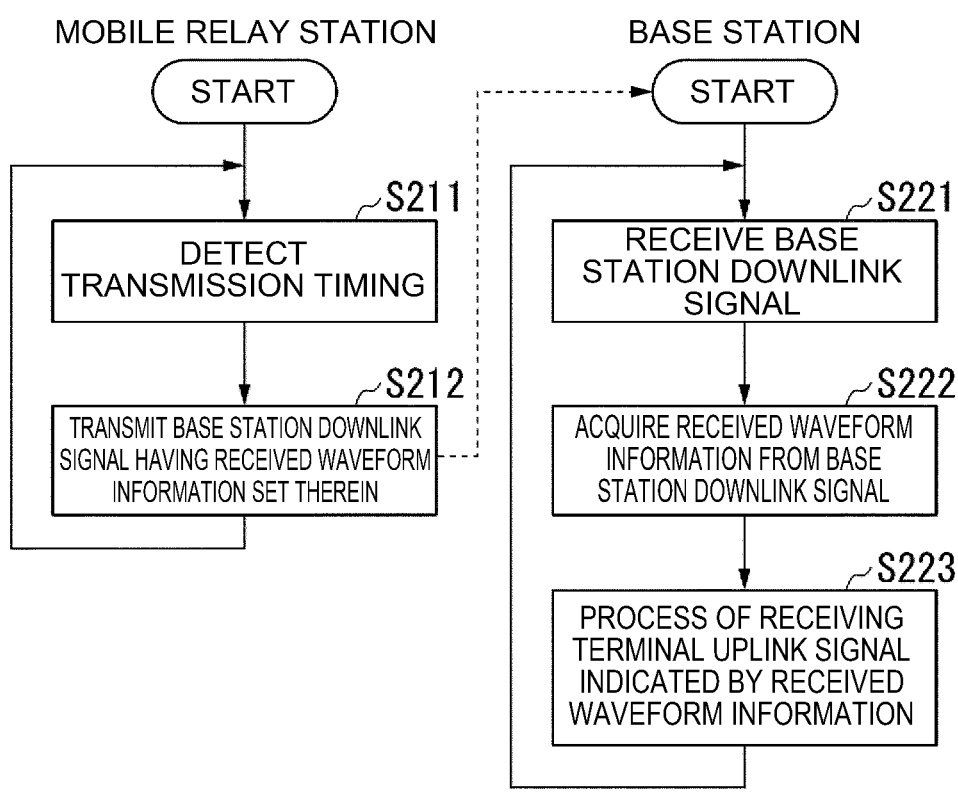
FIG. 5 is a flowchart showing the data collection process of the wireless communication system according to the embodiment.

FIG. 5 is a flowchart showing a process of the wireless communication system 1 in a case where a base station downlink signal is transmitted from the mobile relay station 2 to the base station 4.

When the control unit 242 that the base station communication unit 24 of the mobile relay station 2 has detects that a transmission start timing stored in the storage unit 241 has come, the control unit 242 instructs the transmission data modulation unit 243 and the transmission unit 244 to transmit received waveform information (step S211). The transmission data modulation unit 243 reads out received waveform information accumulated in the data storage unit 23 as transmission data, modulates the read-out transmission data, and generates a base station downlink signal. The transmission unit 244 wirelessly transmits the base station downlink signal generated by the transmission data modulation unit 243 from the antenna 25 (step S212). The mobile relay station 2 repeats the processes from step S211 onward.

The antenna 41 of the base station 4 receives the base station downlink signal from the mobile relay station 2 (step S221). The reception unit 42 converts the base station downlink signal received by the antenna 41 into a received signal as an electric signal, and outputs the received signal to the base station signal reception processing unit 43. The base station signal reception processing unit 43 demodulates the received signal and decodes the demodulated received signal (step S222). The base station signal reception processing unit 43 outputs the received waveform information obtained through the decoding to the terminal signal reception processing unit 44.

The terminal signal reception processing unit 44 performs a process of receiving a terminal uplink signal represented by waveform data included in the received waveform information (step S223). Specifically, the terminal signal demodulation unit 441 identifies a wireless communication system used by the terminal station 3 to transmit the terminal uplink signal on the basis of information peculiar to the wireless communication system included in the received signal represented by the waveform data. The terminal signal demodulation unit 441 demodulates the received signal represented by the waveform data in accordance with the identified wireless communication system and outputs a symbol obtained through the demodulation to the terminal signal decode unit 442. The terminal signal decode unit 442 decodes the symbol input from the terminal signal demodulation unit 441 by the identified wireless communication system and obtains terminal transmission data transmitted from the terminal station 3. Note that the terminal signal decode unit 442 can also use a computationally taxing decoding system, such as SIC (Successive Interference Cancellation). The base station 4 repeats the processes from step S221 onward.

(Transmission Execution Timing Determination Process)

Configurations of the devices in the transmission execution timing determination process will be described.

A configuration of the mobile relay station 2 will be described. As shown in FIG. 1, the mobile relay station 2 further includes a communication situation measurement unit 223 (indicator), a transmission control unit 224 (relay device controller), a storage unit 225, and a transmission unit 226 (relay device transmitter).

The communication situation measurement unit 223 measures a communication situation in the reception unit 221 at the time of reception of a test signal transmitted from the terminal station 3. The communication situation measurement unit 223 generates information (hereinafter referred to as "congestion degree information") indicating the degree of communication congestion on the basis of a measurement result. For example, the communication situation measurement unit 223 measures the number of terminal uplink communication accesses per unit time from the plurality of terminal stations 3 or RSSI in a terminal uplink communication frequency band in the reception unit 221 and generates congestion degree information. The communication situation measurement unit 223 outputs the generated congestion degree information to the transmission control unit 224.

Congestion degree information includes, for example, information indicating a result of measuring a communication situation, a reception time of a test signal, and the identification information for identification of the terminal station 3 included in the test signal.

The transmission control unit 224 acquires congestion degree information output from the communication situation measurement unit 223. The transmission control unit 224 determines, on the basis of information indicating a result of measuring a communication situation included in the congestion degree information, whether the communication situation is good or poor. As described earlier, for example, the mobile relay station 2 determines that the communication situation is good if RSSI is not less than the predetermined threshold and determines that the communication situation is poor if the RSSI is less than the predetermined threshold. The transmission control unit 224 generates correspondence information in which information indicating a determination result, a reception time of a test signal included in the acquired congestion degree information, and the identification information for identification of the terminal station 3 are associated and records the correspondence information in the storage unit 225. Respective pieces of correspondence information as described above based on a plurality of test signals transmitted from the single terminal station 3 during one communication-enabled time frame are recorded in the storage unit 225.

After a communication-enabled time frame for the terminal station 3 ends, the transmission control unit 224 refers to the storage unit 225 and collectively acquires pieces of correspondence information associated with the identification information for identification of the terminal station 3, for example, by the time of approach to the terminal station 3 during a next orbital revolution. The transmission control unit 224 generates, on the basis of the acquired pieces of correspondence information, communication situation information (i.e., information including pieces of information indicating determination results, reception times of test signals, and the identification information for identification of the terminal station 3 in one communication-enabled time frame). The transmission control unit 224 outputs the generated communication situation information to the transmission unit 226.

The transmission unit 226 acquires communication situation information from the transmission control unit 224. The transmission unit 226 wirelessly transmits a terminal downlink signal having the acquired communication situation information set therein from the antenna 21. The transmission unit 226 transmits the signal by LPWA. As LPWA, an arbitrary wireless communication system, such as LoRaWAN®, Sigfox®, LTE-M, or NB-IoT, can be used. The transmission unit 226 determines a channel which the mobile relay station 2 uses to transmit the terminal downlink signal by a method determined in advance in the wireless communication system to be used. A timing for the transmission unit 226 to transmit the terminal downlink signal is controlled by the transmission control unit 224.

The storage unit 225 stores respective transmission start timings calculated in advance for the terminal stations 3 on the basis of the orbit information of the LEO satellite, on which the mobile relay station 2 (the local station) is mounted, and positions of the terminal stations 3. The orbit information of the LEO is information from which a position, a speed, a movement direction, and the like of the LEO satellite at an arbitrary time can be obtained. A transmission time may be represented by, for example, an elapsed time period since a transmission start timing. The transmission control unit 224 controls the transmission unit 226 such that the transmission unit 226 transmits a terminal downlink signal having communication situation information set therein to each terminal station 3 at a transmission start timing for the terminal station 3 stored in the storage unit 225.

As described earlier, the mobile relay station 2 is provided on, for example, a LEO satellite which orbits with a predetermined period above the earth. For example, the transmission control unit 224 sets, in a terminal downlink signal, communication situation information which is generated on the basis of the degrees of communication congestion at the time of reception of test signals from the terminal station 3 at an earlier time (e.g., at time points during a previous orbital revolution).

Note that the transmission control unit 224 may set, in a terminal downlink signal, for example, communication situation information which is generated on the basis of the degrees of communication congestion at the time of reception of test signals from the terminal station 3 in the same time frame in the past. Alternatively, the transmission control unit 224 may immediately set communication situation information in a terminal downlink signal at a timing when test signals are received from the terminal station 3 and transmit the terminal downlink signal toward the ground.

A configuration of the terminal station 3 will be described below. As shown in FIG. 1, the terminal station 3 further includes a reception unit 34 (communication device receiver), a transmission control unit 35 (communication device controller), a position information generation unit 36, and an orbit information storage unit 37.

The position information generation unit 36 includes a positioning device, such as a GPS receiver, and can identify the position of the terminal station 3 and a current time. The position information generation unit 36 generates position information indicating the identified position of the terminal station 3.

The orbit information storage unit 37 stores in advance the orbit information of the LEO satellite, on which the mobile relay station 2 is mounted.

The transmission control unit 35 calculates a communication-enabled time frame which is a time frame when communication with the mobile relay station 2 is possible on the basis of the orbit information stored in the orbit information storage unit 37 and position information indicating the position of the terminal station 3 generated by the position information generation unit 36. The transmission control unit 35 detects that a current time has reached the communication-enabled time frame. The transmission control unit 35 controls the transmission unit 32 and causes the transmission unit 32 to transmit a test signal toward the mobile relay station 2 a plurality of times at, for example, predetermined intervals (e.g., every one minute) during the calculated communication-enabled time frame. The transmission unit 32 wirelessly transmits a test signal from the antenna(s) 33.

The reception unit 34 receives a terminal downlink signal having communication situation information set therein which is transmitted from the mobile relay station 2 with the antenna(s) 33.

The transmission control unit 35 acquires communication situation information from a terminal downlink signal received by the reception unit 34. The transmission control unit 35 determines a transmission execution timing to execute transmission of a terminal uplink signal to the mobile relay station 2 on the basis of the communication situation information. After that, the transmission control unit 35 controls the transmission unit 32 such that the transmission unit 32 transmits a terminal uplink signal having terminal transmission data set therein to the mobile relay station 2 at the determined transmission execution timing each time the mobile relay station 2 makes an orbital revolution.

The transmission unit 32 reads out sensor data as terminal transmission data from the data storage unit 31 and wirelessly transmits a terminal uplink signal having the read-out terminal transmission data set therein from the antenna(s) 33, under control of the transmission control unit 35.

Operation of the wireless communication system 1 in the transmission execution timing determination process will be described below.

Figure 6:
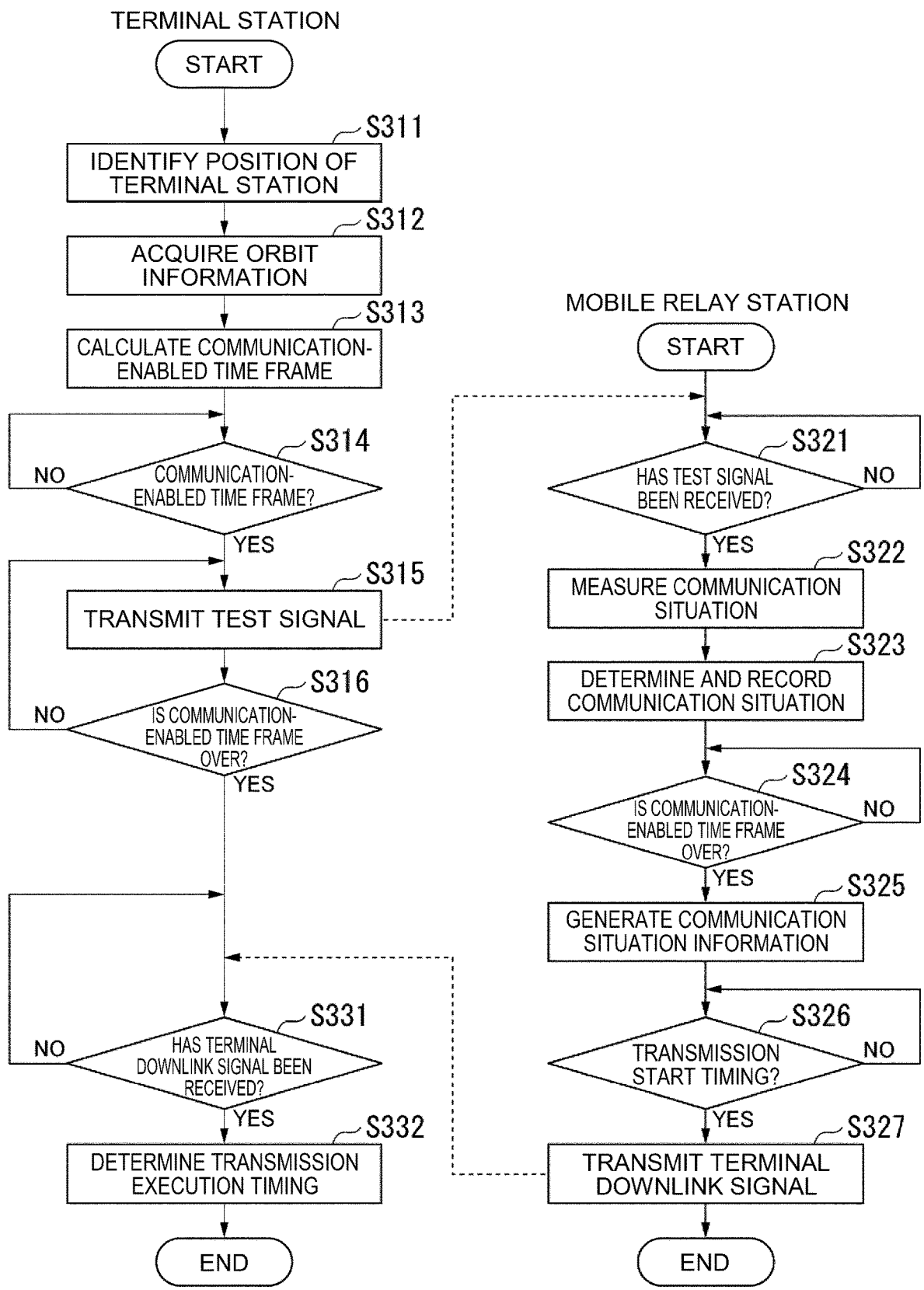
FIG. 6 is a flowchart showing a transmission execution timing determination process of the wireless communication system according to the embodiment.

FIG. 6 is a flowchart showing the transmission execution timing determination process by the wireless communication system 1. The transmission execution timing determination process indicated by the flowchart in FIG. 6 is started, for example, at the time of initial activation of the wireless communication system 1 or at the time of initial activation of the terminal station 3.

The position information generation unit 36 of the terminal station 3 identifies the position of the terminal station 3 with, for example, the positioning device, such as a GPS receiver (step S311). The transmission control unit 35 of the terminal station 3 acquires position information indicating the position of the terminal station 3 identified by the position information generation unit 36. The transmission control unit 35 acquires the orbit information of the LEO satellite, on which the mobile relay station 2 is mounted, which is stored in the orbit information storage unit 37 (step S312). The transmission control unit 35 calculates a communication-enabled time frame which is a time frame when communication with the mobile relay station 2 is possible on the basis of the position information indicating the position of the terminal station 3 and the orbit information (step S313).

The transmission control unit 35 waits until a current time reaches the communication-enabled time frame. If the transmission control unit 35 detects that the current time has reached the communication-enabled time frame (step S314), the transmission control unit 35 controls the transmission unit 32 and causes the transmission unit 32 to transmit a test signal toward the mobile relay station 2 (step S315). The transmission unit 32 wirelessly transmits the test signal from the antenna(s) 33. The transmission control unit 35 repeatedly transmits a test signal toward the mobile relay station 2 at, for example, predetermined intervals (e.g., every one minute) (step S315) while the current time is in the communication-enabled time frame (NO in step S316). If the communication-enabled time frame ends (YES in step S316), the transmission control unit 35 ends transmission of a test signal and waits.

The reception unit 211 of the mobile relay station 2 waits for a test signal transmitted from the terminal station 3 (step S321). If a test signal transmitted from the terminal station 3 is received (YES in step S321), the communication situation measurement unit 223 of the mobile relay station 2 measures a communication situation in the reception unit 221 (step S322). The communication situation measurement unit 223 generates congestion degree information on the basis of a measurement result. As described earlier, the congestion degree information includes, for example, information indicating the result of measuring the communication situation, a reception time of the test signal, and the identification information for identification of the terminal station 3 included in the test signal.

The transmission control unit 224 of the mobile relay station 2 acquires the congestion degree information output from the communication situation measurement unit 223. The transmission control unit 224 determines, on the basis of the information indicating the result of measuring the communication situation included in the congestion degree information, whether the communication situation is good or poor. As described earlier, for example, the mobile relay station 2 determines that the communication situation is good if RSSI is not less than the predetermined threshold and determines that the communication situation is poor if the RSSI is less than the predetermined threshold. The transmission control unit 224 generates correspondence information in which information indicating a determination result is associated with the reception time of the test signal and the identification information for identification of the terminal station 3 included in the acquired congestion degree information and records the correspondence information in the storage unit 225 (step S323). Respective pieces of correspondence information based on a plurality of test signals transmitted from the single terminal station 3 during the communication-enabled time frame are recorded in the storage unit 225.

If the communication-enabled time frame for communication with the terminal station 3 ends (YES in step S324), the transmission control unit 224 refers to the storage unit 225 and collectively acquires the pieces of correspondence information associated with the identification information for identification of the terminal station 3. The transmission control unit 224 generates communication situation information (i.e., information including pieces of information indicating determination results, reception times of test signals, and the identification information for identification of the terminal station 3 in one communication-enabled time frame) on the basis of the acquired pieces of correspondence information (step S325).

A described earlier, the storage unit 225 stores a transmission start timing calculated in advance for each terminal station 3 on the basis of the orbit information of the LEO satellite, on which the mobile relay station 2 is mounted, and the position of the terminal station 3. The transmission control unit 224 waits until the current time reaches the transmission start timing (step S326). If the current time reaches the transmission start timing (YES in step S326), the transmission control unit 224 controls the transmission unit 226 such that the transmission unit 226 transmits a terminal downlink signal having the communication situation information set therein toward the ground. For example, the transmission control unit 224 sets, in a terminal downlink signal, communication situation information which is generated on the basis of the degrees of communication congestion at the time of reception of test signals from the terminal station 3 at an earlier time (e.g., at time points during a previous orbital revolution).

The transmission unit 226 of the mobile relay station 2 determines a channel which the mobile relay station 2 uses to transmit the terminal downlink signal by a method determined in advance in a wireless communication system to be used. The transmission unit 226 of the mobile relay station 2 wirelessly transmits the terminal downlink signal having the communication situation information generated by the transmission control unit 224 set therein from the antenna 21 toward the ground (step S327). With the above-described processes, operation of the mobile relay station 2 in the transmission execution timing determination process indicated by the flowchart in FIG. 6 ends.

The reception unit 34 of the terminal station 3 waits for reception of the terminal downlink signal having the communication situation information and the identification information of the terminal station 3 set therein, which is transmitted from the mobile relay station 2 (step S331). If the reception unit 34 receives the terminal downlink signal having the communication situation information and the identification information of the terminal station 3 set therein with the antenna(s) 33 (YES in step S331), the transmission control unit 35 acquires the communication situation information from the terminal downlink signal received by the reception unit 34. The transmission control unit 35 determines a transmission execution timing to execute transmission of a terminal uplink signal having terminal transmission data set therein to the mobile relay station 2 on the basis of the communication situation information (step S332).

With the above-described processes, operation of the terminal station 3 and the wireless communication system 1 in the transmission execution timing determination process indicated by the flowchart in FIG. 6 ends.

As described above, in the wireless communication system 1 according to the first embodiment, each terminal station 3 identifies a communication-enabled time frame on the basis of the position of itself and the orbit information of the mobile relay station 2 that orbits. Each terminal station 3 repeatedly transmits a test signal toward the mobile relay station 2 at a plurality of transmission timings during a communication-enabled time frame in one orbital revolution of the mobile relay station 2.

The mobile relay station 2 receives test signals obtained through repeated transmission from the terminal station 3 at the plurality of transmission timings and measures respective communication situations at the time of reception of the test signals. The mobile relay station 2 determines, on the basis of results of measuring the communication situations, whether the communication situation at each of the plurality of transmission timings is good or poor. The mobile relay station 2 transmits a terminal downlink signal having communication situation information based on results of determining the communication situations set therein toward the ground, for example, when the mobile relay station 2 approaches the terminal station 3 in a next orbital revolution.

The terminal station 3 receives the terminal downlink signal having the communication situation information set therein that is transmitted from the mobile relay station 2 with the antenna(s) 33. If identification information set in the terminal downlink signal is the identification information for identification of itself (i.e., in the case of a terminal downlink signal transmitted to itself), the terminal station 3 acquires the communication situation information from the terminal downlink signal. The terminal station 3 determines a transmission execution timing to execute transmission of a terminal uplink signal to the mobile relay station 2 on the basis of the acquired communication situation information. After that, the terminal station 3 transmits a terminal uplink signal having terminal transmission data, such as environmental data, set therein to the mobile relay station 2 at the determined transmission execution timing each time the mobile relay station 2 makes an orbital revolution.

With the above-described configuration, the wireless communication system 1 according to the present embodiment can determine, for each terminal station 3, a transmission execution timing with a good communication situation during a communication-enabled time frame. Since the wireless communication system 1 according to the present embodiment can moderate the degree of communication congestion (e.g., prevent a communication bandwidth shortage or the like) in communication between the plurality of terminal stations 3 and the mobile relay station 2, the wireless communication system 1 can curb reduction in communication reliability.

The wireless communication system 1 according to the present embodiment can be configured, for example, such that the terminal station 3 randomly selects a transmission execution timing from among a plurality of transmission timings indicated by communication situation information. With this configuration, for example, if there is a plurality of terminal stations 3 at positions close to each other, the wireless communication system 1 according to the present embodiment can avoid a situation where the plurality of terminal stations 3 simultaneously transmit terminal uplink signals to the mobile relay station 2. Since this allows the wireless communication system 1 to further moderate the degree of communication congestion in communication between the plurality of terminal stations 3 and the mobile relay station 2, reduction in communication reliability can be further curbed.

First Modification of First Embodiment

In the present modification, a mobile relay station transmits base station downlink signals with a plurality of antennas. A description will be given below with a focus on differences from the first embodiment, taking as an example a case using MIMO (Multiple Input Multiple Output) to transmit a base station downlink signal.

Figure 7:
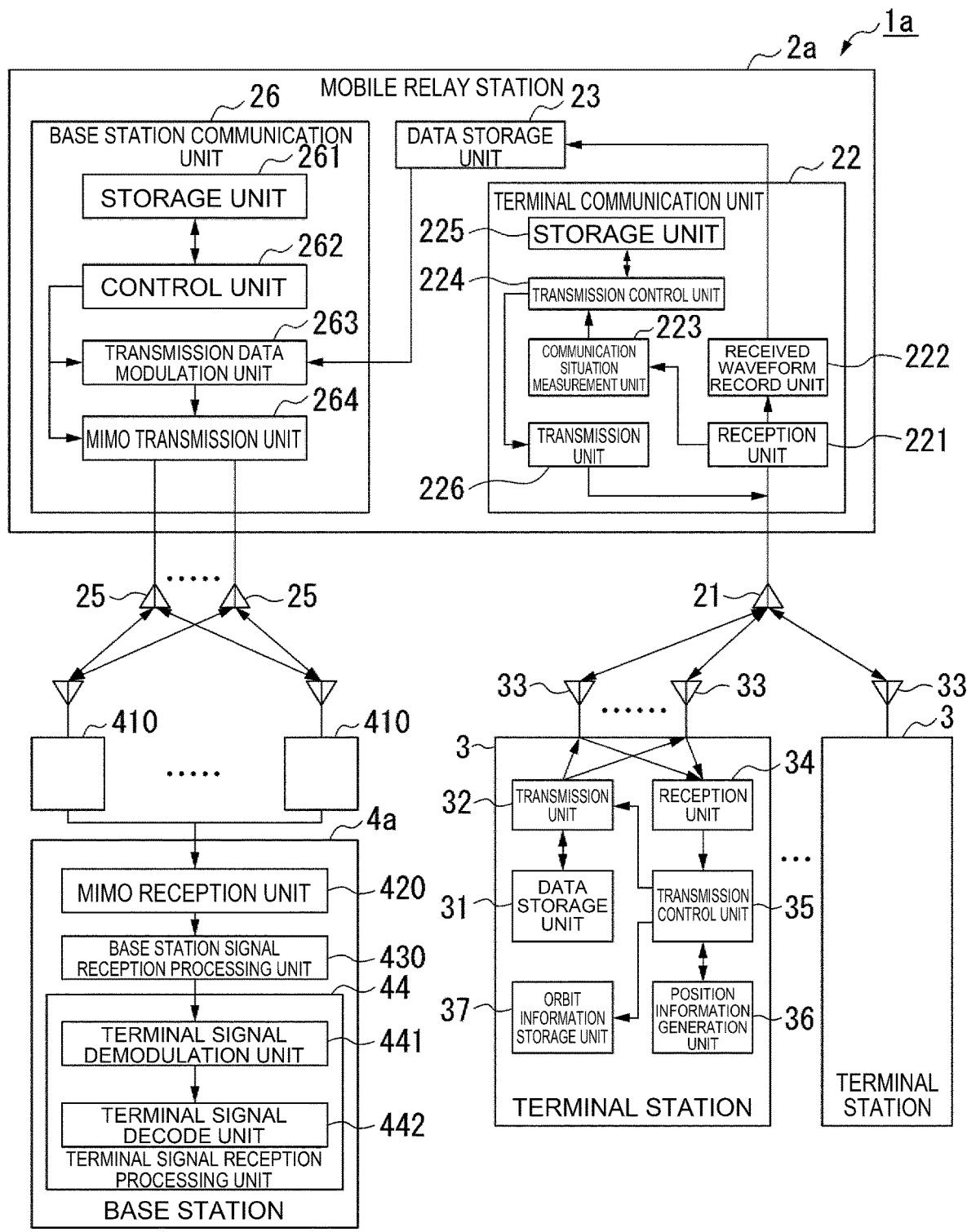
FIG. 7 is a diagram of a configuration of a wireless communication system according to a first modification of the first embodiment of the present invention.

FIG. 7 is a diagram of a configuration of a wireless communication system 1a according to a first modification of the first embodiment. In FIG. 7, the same components as in the wireless communication system 1 according to the first embodiment shown in FIG. 1 are denoted by the same reference numerals, and a description thereof will be omitted. The wireless communication system 1a has a mobile relay station 2a (relay apparatus), the terminal station 3 (communication apparatus), and a base station 4a.

The mobile relay station 2a includes the antenna 21, the terminal communication unit 22, the data storage unit 23, a base station communication unit 26, and a plurality of antennas 25. The base station communication unit 26 transmits received waveform information to the base station 4a by MIMO. The base station communication unit 26 includes a storage unit 261, a control unit 262, a transmission data modulation unit 263, and a MIMO transmission unit 264. The storage unit 261 stores a transmission start timing calculated in advance on the basis of orbit information of a LEO satellite on which the mobile relay station 2a is mounted and a position of the base station 4a. The storage unit 261 also stores in advance respective weights for transmission times for a base station downlink signal to be transmitted from each antenna 25. The respective weights for the transmission times are calculated on the basis of the orbit information of the LEO satellite and respective positions of antenna stations 410 which the base station 4a includes. Note that a fixed weight may be used regardless of transmission time.

The control unit 262 controls the transmission data modulation unit 263 and the MIMO transmission unit 264 such that the transmission data modulation unit 263 and the MIMO transmission unit 264 transmit received waveform information to the base station 4a at the transmission start timing stored in the storage unit 261. The control unit 262 also communicates the respective weights for the transmission times read out from the storage unit 261 to the MIMO transmission unit 264. The transmission data modulation unit 263 reads out received waveform information as transmission data from the data storage unit 23, converts the read-out transmission data into a parallel signal, and modulates the parallel signal. The MIMO transmission unit 264 adds one of the weights communicated by the control unit 262 to the modulated parallel signal to generate base station downlink signals to be transmitted from the respective antennas 25. The MIMO transmission unit 264 transmits the generated base station downlink signals from the antennas 25 by MIMO.

The base station 4a includes a plurality of antenna stations 410, a MIMO reception unit 420, a base station signal reception processing unit 430, and the terminal signal reception processing unit 44. Each antenna station 410 is arranged at a position away from the other antenna stations 410 such that differences between arrival angles of signals from the plurality of antennas 25 of the mobile relay station 2a are large. Each antenna station 410 converts a base station downlink signal received from the mobile relay station 2a into an electric signal and outputs the electric signal to the MIMO reception unit 420.

The MIMO reception unit 420 aggregates base station downlink signals received from the plurality of antenna stations 410. The MIMO reception unit 420 stores respective weights for reception times for the respective base station downlink signals received by the antenna stations 410 on the basis of the orbit information of the LEO satellite and the positions of the antenna stations 410. The MIMO reception unit 420 multiplies the respective base station downlink signals input from the antenna stations 410 by weights corresponding to reception times of the base station downlink signals to synthesize received signals obtained through the multiplication by the weights. Note that the same weight may be used regardless of reception time. The base station signal reception processing unit 430 demodulates and decodes a received signal obtained through the synthesis to obtain received waveform information. The base station signal reception processing unit 430 outputs the received waveform information to the terminal signal reception processing unit 44.

Operation of the wireless communication system 1a will be described below.

A process of the wireless communication system 1a in a case where a terminal uplink signal is transmitted from the terminal station 3 is the same as the process of the wireless communication system 1 according to the first embodiment shown in FIG. 4.

Figure 8:
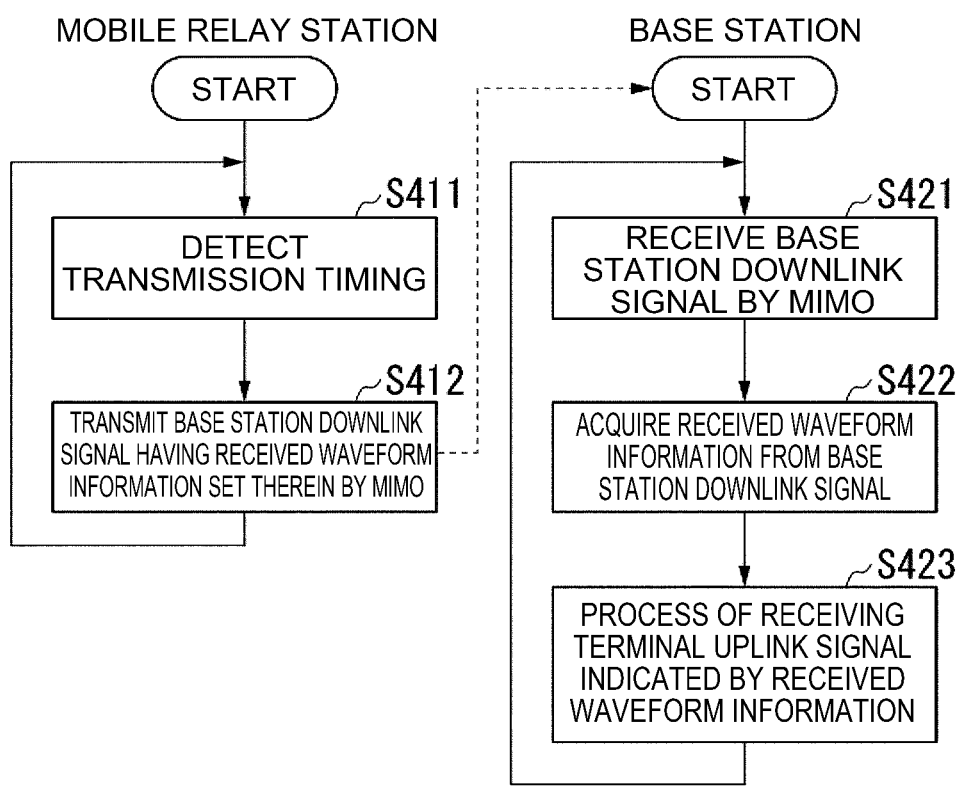
FIG. 8 is a flowchart showing a data collection process of the wireless communication system according to the modification.

FIG. 8 is a flowchart showing a process of the wireless communication system 1a in a case where a base station downlink signal is transmitted from the mobile relay station 2a. When the control unit 262 that the base station communication unit 26 of the mobile relay station 2a has detects that a transmission start timing stored in the storage unit 261 has come, the control unit 262 instructs the transmission data modulation unit 263 and the MIMO transmission unit 264 to transmit received waveform information (step S411). The transmission data modulation unit 263 reads out received waveform information accumulated in the data storage unit 23 as transmission data, performs parallel conversion on the read-out transmission data, and modulates the transmission data. The MIMO transmission unit 264 adds a weight communicated by the control unit 262 to the transmission data modulated by the transmission data modulation unit 263 to generate base station downlink signals which are respective transmitted signals to be transmitted from the antennas 25. The MIMO transmission unit 264 transmits the respective generated base station downlink signals from the antennas 25 by MIMO (step S412). The mobile relay station 2a repeats the processes from step S411 onward.

The antenna stations 410 of the base station 4a receive the respective base station downlink signals from the mobile relay station 2a (step S421). Each antenna station 410 outputs a received signal obtained by converting the received base station downlink signal into an electric signal to the MIMO reception unit 420. The MIMO reception unit 420 synchronizes respective timings of the received signals received from the antenna stations 410. The MIMO reception unit 420 multiplies the received signals received by the antenna stations 410 by respective weights and adds up the received signals. The base station signal reception processing unit 430 demodulates a received signal obtained through the adding up and decodes the demodulated received signal (step S422). The base station signal reception processing unit 430 outputs received waveform information obtained through the decoding to the terminal signal reception processing unit 44.

The terminal signal reception processing unit 44 performs a process of receiving a terminal uplink signal represented by waveform data included in the received waveform information (step S423) through the same process as in step S223 in the processing flow according to the first embodiment shown in FIG. 5. That is, the terminal signal demodulation unit 441 identifies a wireless communication system used by the terminal station 3 to transmit the terminal uplink signal on the basis of information peculiar to the wireless communication system included in the received signal represented by the waveform data. The terminal signal demodulation unit 441 demodulates the received signal represented by the waveform data in accordance with the identified wireless communication system and outputs a symbol obtained through the demodulation to the terminal signal decode unit 442. The terminal signal decode unit 442 decodes the symbol input from the terminal signal demodulation unit 441 by the identified wireless communication system and obtains terminal transmission data transmitted from the terminal station 3. Note that the terminal signal decode unit 442 can also use a computationally taxing decoding system, such as SIC. The base station 4a repeats the processes from step S421 onward.

In the wireless communication system 1a according to the present modification, the mobile relay station 2a is capable of collectively transmitting pieces of data received from a plurality of terminal stations 3 and accumulated with high quality at timings when communication with the base station 4a is possible in a short time period.

Second Modification of First Embodiment

In the present modification, a mobile relay station receives terminal uplink signals with a plurality of antennas and transmits terminal downlink signals with a plurality of antennas. A description will be given below with a focus on differences from the aforementioned first modification of the first embodiment.

Figure 9:
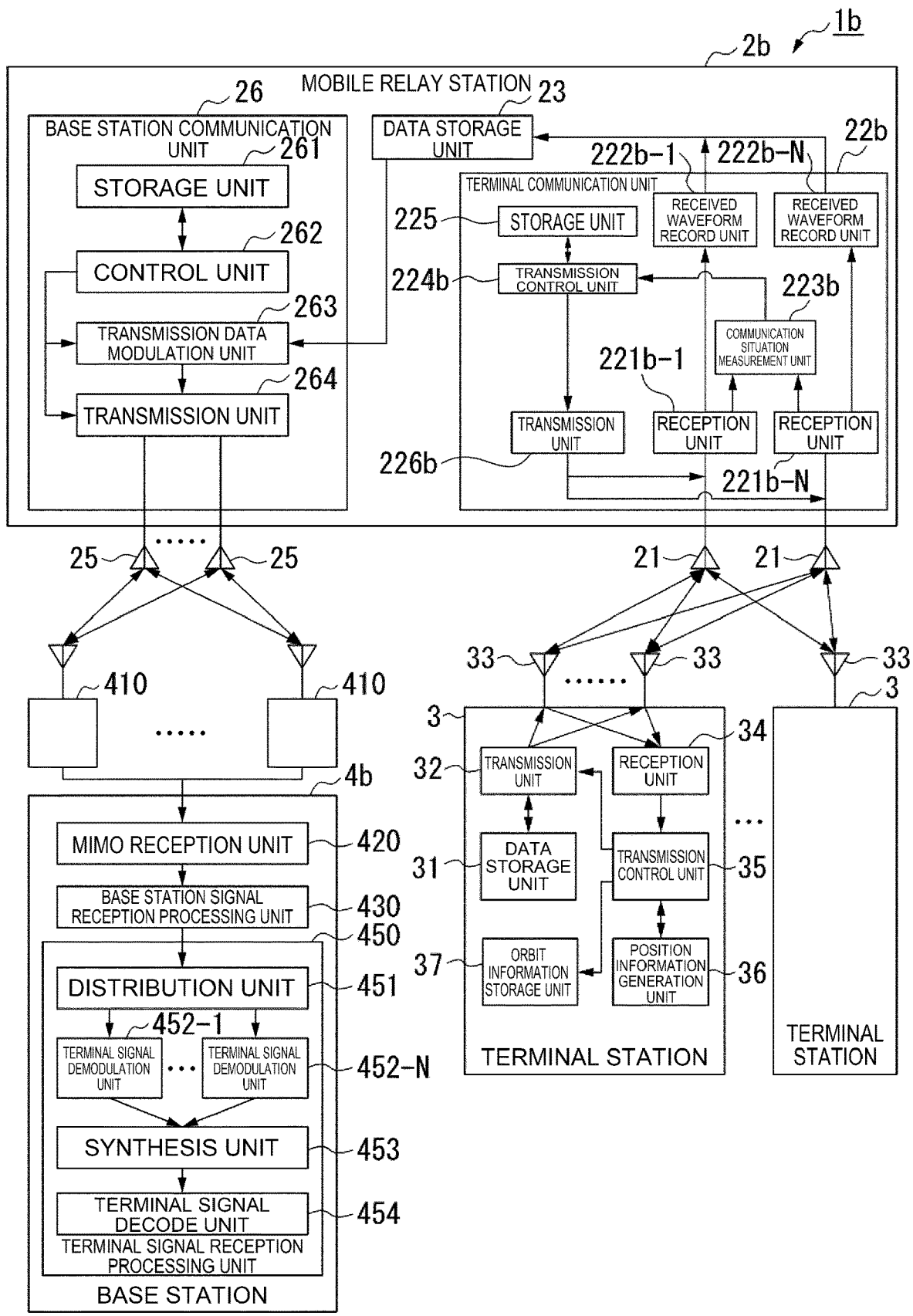
FIG. 9 is a diagram of a configuration of a wireless communication system according to a second modification of the first embodiment of the present invention.

FIG. 9 is a diagram of a configuration of a wireless communication system 1b according to a second modification of the first embodiment. In FIG. 9, the same components as in the wireless communication system 1a according to the first modification of the first embodiment shown in FIG. 5 are denoted by the same reference numerals, and a description thereof will be omitted. The wireless communication system 1b has a mobile relay station 2b (relay apparatus), the terminal station 3 (communication apparatus), and a base station 4b.

The mobile relay station 2b includes N antennas 21 (N is an integer not less than 2), a terminal communication unit 22b, the data storage unit 23, a base station communication unit 26, and a plurality of antennas 25. The N antennas 21 are referred to as antennas 21-1 to 21-N, respectively.

The terminal communication unit 22b has N reception units 221b and N received waveform record units 222b. The N reception units 221b are referred to as reception units 221b-1 to 221b-N, respectively, and the N received waveform record units 222b are referred to as received waveform record units 222b-1 to 222b-N, respectively. A reception unit 221b-n (n is an integer not less than 1 and not more than N) receives a terminal uplink signal with an antenna 21-n. A received waveform record unit 222b-n samples a received waveform of the terminal uplink signal received by the reception unit 221b-n and generates waveform data indicating a value obtained by the sampling. The received waveform record unit 222b-n writes, in the data storage unit 23, received waveform information having an antenna identifier of the antenna 21-n, a reception time of the terminal uplink signal in the antenna 21-n, and the generated waveform data set therein. The antenna identifier is information for identification of the antenna 21-n. The data storage unit 23 stores pieces of received waveform information including pieces of waveform data of respective terminal uplink signals received by the antennas 21-1 to 21-N.

The base station 4b includes a plurality of antenna stations 410, a MIMO reception unit 420, a base station signal reception processing unit 430, and a terminal signal reception processing unit 450.

The terminal signal reception processing unit 450 performs a process of receiving a terminal uplink signal indicated by received waveform information. At this time, the terminal signal reception processing unit 450 performs the reception process by a wireless communication system used by the terminal station 3 for transmission and acquires terminal transmission data. The terminal signal reception processing unit 450 includes a distribution unit 451, N terminal signal demodulation units 452, a synthesis unit 453, and a terminal signal decode unit 454. The N terminal signal demodulation units 452 are referred to as terminal signal demodulation units 452-1 to 452-N, respectively.

The distribution unit 451 reads out pieces of waveform data with the same reception times from pieces of received waveform information and outputs the read-out pieces of waveform data to the terminal signal demodulation units 452-1 to 452-N in accordance with antenna identifiers associated with the pieces of waveform data. That is, the distribution unit 451 outputs waveform data associated with the antenna identifier of the antenna 21-$n$ to a terminal signal demodulation unit 452-$n$. The terminal signal demodulation units 452-1 to 452-N demodulate signals represented by the pieces of waveform data and output symbols obtained through the demodulation to the synthesis unit 453. The terminal signal demodulation unit 452-$n$ may perform demodulation after performing a process of compensating for a Doppler shift of a terminal uplink signal received by the antenna 21-$n$ of the mobile relay station 2 on a signal represented by the waveform data. A Doppler shift which a terminal uplink signal received by each antenna 21-$n$ is to undergo is calculated in advance on the basis of a position of the terminal station 3 and orbit information of a LEO on which the mobile relay station 2$b$ is mounted. The synthesis unit 453 adds and synthesizes the symbols input from the terminal signal demodulation units 452-1 to 452-N and outputs a symbol to the terminal signal decode unit 454. The terminal signal decode unit 454 decodes the symbol obtained through the addition and synthesis and obtains terminal transmission data transmitted from the terminal station 3.

As shown in FIG. 9, the mobile relay station 2$b$ further includes a communication situation measurement unit 223$b$, a transmission control unit 224$b$, the storage unit 225, and a transmission unit 226$b$.

The communication situation measurement unit 223$b$ measures a communication situation in the reception units 221$b$-1 to 221$b$-N at the time of reception of each of test signals transmitted from a plurality of terminal stations 3. The communication situation measurement unit 223$b$ generates congestion degree information on the basis of a measurement result. For example, the communication situation measurement unit 223$b$ measures the number of terminal uplink communication accesses per unit time from the plurality of terminal stations 3 or RSSI in a terminal uplink communication frequency band in the reception units 221$b$-1 to 221$b$-N and generates the congestion degree information. The communication situation measurement unit 223 outputs the generated congestion degree information to the transmission control unit 224$b$.

As described earlier, congestion degree information includes, for example, information indicating a result of measuring a communication situation, a reception time of a test signal, and identification information for identification of the terminal station 3 included in the test signal.

The transmission control unit 224$b$ acquires congestion degree information output from the communication situation measurement unit 223$b$. The transmission control unit 224$b$ determines, on the basis of information indicating a result of measuring a communication situation included in the congestion degree information, whether the communication situation is good or poor. As described earlier, for example, the mobile relay station 2$b$ determines that the communication situation is good if RSSI is not less than a predetermined threshold and determines that the communication situation is poor if the RSSI is less than the predetermined threshold. The transmission control unit 224$b$ generates correspondence information in which information indicating a determination result is associated with a reception time of a test signal included in the acquired congestion degree information and the identification information for identification of the terminal station 3 and records the correspondence information in the storage unit 225. Respective pieces of correspondence information as described above based on a plurality of test signals transmitted from the single terminal station 3 during a communication-enabled time frame are recorded in the storage unit 225.

After a communication-enabled time frame for the terminal station 3 ends, the transmission control unit 224$b$ refers to the storage unit 225 and collectively acquires pieces of correspondence information associated with the identification information for identification of the terminal station 3, for example, by the time of approach to the terminal station 3 during a next orbital revolution. The transmission control unit 224$b$ generates, on the basis of the acquired pieces of correspondence information, communication situation information (i.e., information including information indicating determination results, reception times of test signals, and the identification information for identification of the terminal station 3 in one communication-enabled time frame). The transmission control unit 224$b$ outputs the generated communication situation information to the transmission unit 226$b$.

The transmission unit 226$b$ acquires communication situation information from the transmission control unit 224$b$. The transmission unit 226$b$ wirelessly transmits terminal downlink signals having the acquired communication situation information set therein from the antennas 21-1 to 21-N. The transmission unit 226$b$ transmits the signals by LPWA. The transmission unit 226$b$ determines a channel which the mobile relay station 2$b$ uses to transmit the terminal downlink signals by a method determined in advance in a wireless communication system to be used. A timing for the transmission unit 226$b$ to transmit the terminal downlink signals is controlled by the transmission control unit 224$b$.

The storage unit 225 stores respective transmission start timings calculated in advance for the terminal stations 3 on the basis of the orbit information of the LEO satellite, on which the mobile relay station 2$b$ is mounted, and positions of the terminal stations 3. The transmission control unit 224$b$ controls the transmission unit 226$b$ such that the transmission unit 226$b$ transmits a terminal downlink signal having communication situation information set therein to each terminal station 3 at a transmission start timing for the terminal station 3 stored in the storage unit 225.

As described earlier, the mobile relay station 2$b$ is provided on, for example, a LEO satellite which orbits with a predetermined period above the earth. For example, the transmission control unit 224$b$ sets, in a terminal downlink signal, communication situation information which is generated on the basis of the degrees of communication congestion at the time of reception of test signals from the terminal station 3 at an earlier time (e.g., at time points during a previous orbital revolution).

Note that the transmission control unit 224$b$ may set, in a terminal downlink signal, for example, communication situation information which is generated on the basis of the degrees of communication congestion at the time of reception of test signals from the terminal station 3 in the same time frame in the past. Alternatively, the transmission control unit 224*b* may immediately set communication situation information in a terminal downlink signal at a timing when test signals are received from the terminal station 3 and transmit the terminal downlink signal toward the ground.

A configuration of the terminal station 3 will be described. As shown in FIG. 9, the terminal station 3 further includes the reception unit 34, the transmission control unit 35, the position information generation unit 36, and the orbit information storage unit 37.

The position information generation unit 36 includes a positioning device, such as a GPS receiver, and can identify the position of the terminal station 3 and a current time. The position information generation unit 36 generates position information indicating the identified position of the terminal station 3.

The orbit information storage unit 37 stores in advance the orbit information of the LEO satellite, on which the mobile relay station 2*b* is mounted.

The transmission control unit 35 calculates a communication-enabled time frame which is a time frame when communication with the mobile relay station 2*b* is possible on the basis of the orbit information stored in the orbit information storage unit 37 and position information indicating the position of the terminal station 3 generated by the position information generation unit 36. The transmission control unit 35 detects that a current time has reached the communication-enabled time frame. The transmission control unit 35 controls the transmission unit 32 and causes the transmission unit 32 to transmit a test signal toward the mobile relay station 2*b* at, for example, predetermined intervals (e.g., every one minute) during the calculated communication-enabled time frame. The transmission unit 32 wirelessly transmits a test signal from the antenna(s) 33.

The reception unit 34 receives a terminal downlink signal having communication situation information set therein which is transmitted from the mobile relay station 2*b* with the antenna(s) 33.

The transmission control unit 35 acquires identification information from a terminal downlink signal received by the reception unit 34. If the acquired identification information is identification information for identification of the terminal station 3, the transmission control unit 35 acquires communication situation information from the terminal downlink signal. The transmission control unit 35 determines a transmission execution timing to execute transmission of a terminal uplink signal to the mobile relay station 2*b* on the basis of the communication situation information. After that, the transmission control unit 35 controls the transmission unit 32 such that the transmission unit 32 transmits a terminal uplink signal having terminal transmission data set therein to the mobile relay station 2*b* at the determined transmission execution timing each time the mobile relay station 2*b* makes an orbital revolution.

The transmission unit 32 reads out sensor data as terminal transmission data from the data storage unit 31 and wirelessly transmits a terminal uplink signal having the read-out terminal transmission data set therein from the antenna(s) 33, under control of the transmission control unit 35 at a transmission execution timing.

Operation of the wireless communication system 1*b* will be described below.

Figure 10:
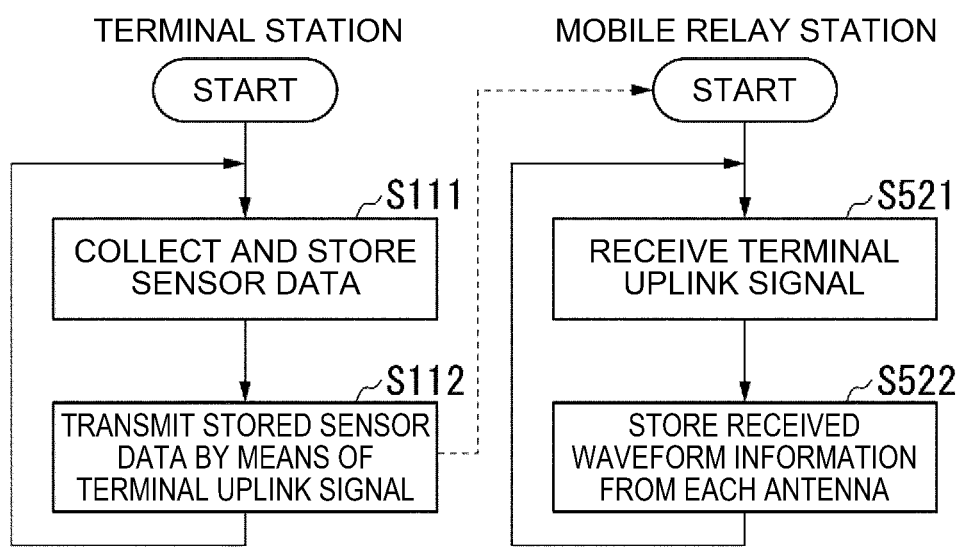
FIG. 10 is a flowchart showing a data collection process of the wireless communication system according to the modification.

FIG. 10 is a flowchart showing a process of the wireless communication system 1*b* in a case where a terminal uplink signal is transmitted from the terminal station 3 to the mobile relay station 2. In FIG. 10, the same processes as in the processing flow according to the first embodiment shown in FIG. 2 are denoted by the same reference characters. The terminal station 3 performs the same processes as the processes in steps S111 and S112 in the processing flow according to the first embodiment shown in FIG. 4. Note that the terminal station 3 may perform transmission through time-division multiplexing, OFDM, MIMO, or the like together with the different terminal station 3.

The reception units 221*b*-1 to 221*b*-N of the mobile relay station 2*b* each receive a terminal uplink signal transmitted from the terminal station 3 (step S521). Depending on a wireless communication system of the terminal station 3 as a transmission source, the reception unit may receive a terminal uplink signal only from the one terminal station 3 in a time-shared manner on the same frequency or may receive terminal uplink signals simultaneously from a plurality of terminal stations 3 on the same frequency. The received waveform record unit 222*b*-*n* writes, in the data storage unit 23, received waveform information in which waveform data representing a waveform of the terminal uplink signal received by the reception unit 221*b*-*n*, a reception time, and an antenna identifier of the antenna 21-*n* are associated (step S522). The mobile relay station 2*b* repeats the processes from step S521 onward.

A process of the wireless communication system 1*b* in a case where a base station downlink signal is transmitted from the mobile relay station 2*b* to the base station 4 is the same as in the processing flow according to the first modification of the first embodiment shown in FIG. 8 except for the following processes. That is, in step S423, the terminal signal reception processing unit 450 performs a process of receiving a terminal uplink signal indicated by received waveform information. Specifically, the distribution unit 451 reads out pieces of waveform data with the same reception times from pieces of received waveform information and outputs the read-out pieces of waveform data to the terminal signal demodulation units 452-1 to 452-N in accordance with antenna identifiers associated with the pieces of waveform data. The terminal signal demodulation units 452-1 to 452-N each identify a wireless communication system used by the terminal station 3 to transmit a terminal uplink signal on the basis of information peculiar to the wireless communication system included in the received signal represented by the waveform data. The terminal signal demodulation units 452-1 to 452-N demodulate the received signals represented by the pieces of waveform data in accordance with the identified wireless communication system and output symbols obtained through the demodulation to the synthesis unit 453.

The synthesis unit 453 adds and synthesizes the respective symbols input from the terminal signal demodulation units 452-1 to 452-N. With the addition and synthesis, signals transmitted by the terminal station 3 are enhanced due to correlation, and effects of randomly added noise are reduced. For this reason, the diversity effect is obtained for terminal uplink signals which the mobile relay station 2*b* simultaneously receives only from one terminal station 3. The addition and synthesis corresponds to MIMO communication for terminal uplink signals which the mobile relay station 2*b* simultaneously receives from a plurality of terminal stations 3. The synthesis unit 453 outputs a symbol obtained through the addition and synthesis to the terminal signal decode unit 454. The terminal signal decode unit 454 decodes the symbol obtained through the addition and synthesis by the synthesis unit 453 by the identified wireless communication system and obtains terminal transmission data transmitted from the terminal station 3. Note that the terminal signal decode unit 454 can also use a computationally taxing decoding system, such as SIC.

Figure 11:
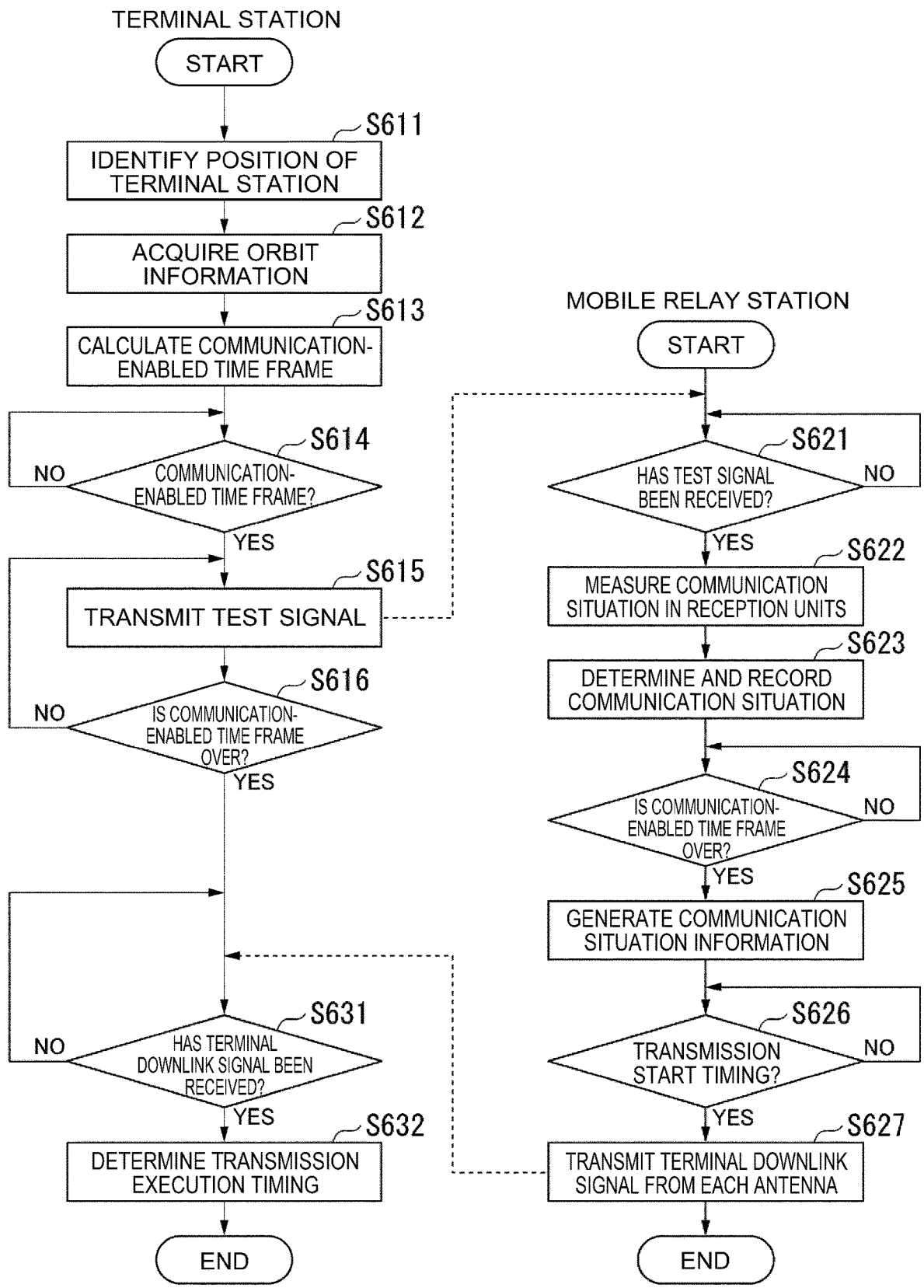
FIG. 11 is a flowchart showing a transmission execution timing determination process of the wireless communication system according to the modification.

FIG. 11 is a flowchart showing a transmission execution timing determination process by the wireless communication system 1*b*. The transmission execution timing determination process indicated by the flowchart in FIG. 11 is started, for example, at the time of initial activation of the wireless communication system 1*b* or at the time of initial activation of the terminal station 3.

The position information generation unit 36 of the terminal station 3 identifies the position of the terminal station 3 with, for example, the positioning device, such as a GPS receiver (step S611). The transmission control unit 35 of the terminal station 3 acquires position information indicating the position of the terminal station 3 identified by the position information generation unit 36. The transmission control unit 35 acquires the orbit information of the LEO satellite, on which the mobile relay station 2 is mounted, which is stored in the orbit information storage unit 37 (step S612). The transmission control unit 35 calculates a communication-enabled time frame which is a time frame when communication with the mobile relay station 2*b* is possible on the basis of the position information indicating the position of the terminal station 3 and the orbit information (step S613).

The transmission control unit 35 waits until a current time reaches the communication-enabled time frame. If the transmission control unit 35 detects that the current time has reached the communication-enabled time frame (step S614), the transmission control unit 35 controls the transmission unit 32 and causes the transmission unit 32 to transmit a test signal toward the mobile relay station 2*b* (step S615). The transmission unit 32 wirelessly transmits the test signal from the antenna(s) 33. The transmission control unit 35 repeatedly transmits a test signal toward the mobile relay station 2 at predetermined intervals (e.g., every one minute) (step S615) while the current time is in the communication-enabled time frame (NO in step S616). If the communication-enabled time frame ends (YES in step S616), the transmission control unit 35 ends transmission of a test signal and waits.

The reception units 221*b*-1 to 221*b*-N of the mobile relay station 2*b* wait for a test signal transmitted from the terminal station 3 (step S621). If a test signal transmitted from the terminal station 3 is received (YES in step S621), the communication situation measurement unit 223*b* of the mobile relay station 2*b* measures a communication situation in the reception units 221*b*-1 to 221*b*-N (step S622). The communication situation measurement unit 223*b* generates congestion degree information on the basis of a measurement result.

The transmission control unit 224*b* of the mobile relay station 2*b* acquires the congestion degree information output from the communication situation measurement unit 223. The transmission control unit 224*b* determines, on the basis of information indicating the result of measuring the communication situations included in the congestion degree information, whether a communication situation is good or poor. The transmission control unit 224*b* generates correspondence information in which information indicating a determination result is associated with a reception time of the test signal included in the acquired congestion degree information and the identification information for identification of the terminal station 3 and records the correspondence information in the storage unit 225 (step S623). Respective pieces of correspondence information as described above based on a plurality of test signals transmitted from the single terminal station 3 during the communication-enabled time frame are recorded in the storage unit 225.

If the communication-enabled time frame for the terminal station 3 ends (YES in step S624), the transmission control unit 224*b* refers to the storage unit 225 and collectively acquires the pieces of correspondence information associated with the identification information for identification of the terminal station 3. The transmission control unit 224*b* generates communication situation information on the basis of the acquired pieces of correspondence information (step S625).

The transmission control unit 224*b* waits until the current time reaches a transmission start timing (step S626). If the current time reaches the transmission start timing (YES in step S626), the transmission control unit 224*b* controls the transmission unit 226*b* such that the transmission unit 226*b* transmits a terminal downlink signal having the communication situation information set therein toward the ground. For example, the transmission control unit 224 sets, in a terminal downlink signal, communication situation information which is generated on the basis of the degrees of communication congestion at the time of reception of test signals from the terminal station 3 at an earlier time (e.g., at time points during a previous orbital revolution).

The transmission unit 226*b* of the mobile relay station 2*b* determines a channel which the mobile relay station 2*b* uses to transmit the terminal downlink signal by a method determined in advance in a wireless communication system to be used. The transmission unit 226*b* of the mobile relay station 2*b* wirelessly transmits the terminal downlink signal having the communication situation information generated by the transmission control unit 224*b* set therein from the antennas 21-1 to 21-N toward the ground (step S627). With the above-described processes, operation of the mobile relay station 2*b* in the transmission execution timing determination process indicated by the flowchart in FIG. 11 ends.

The reception unit 34 of the terminal station 3 waits for reception of the terminal downlink signal having the communication situation information and the identification information of the terminal station 3 set therein, which is transmitted from the mobile relay station 2*b* (step S631). If the reception unit 34 receives the terminal downlink signal having the communication situation information and the identification information of the terminal station 3 set therein with the antenna(s) 33 (YES in step S631), the transmission control unit 35 acquires the communication situation information from the terminal downlink signal received by the reception unit 34. The transmission control unit 35 determines a transmission execution timing to execute transmission of a terminal uplink signal to the mobile relay station 2*b* on the basis of the communication situation information (step S632).

With the above-described processes, operation of the terminal station 3 and the wireless communication system 1*b* in the transmission execution timing determination process indicated by the flowchart in FIG. 11 ends.

According to the present modification, the mobile relay station 2*b* receives a terminal uplink signal transmitted from the terminal station 3 through diversity reception, MIMO reception, or the like. The wireless communication system 1*b* according to the present modification is thus capable of improving a link budget for communication between the mobile relay station 2*b* and the terminal station 3.

Second Embodiment

The aforementioned wireless communication system 1 (or 1*a* or 1*b*) according to the first embodiment is configured such that the terminal station 3 receives a terminal downlink signal having communication situation information set therein once and (randomly) selects one transmission execution timing from among a plurality of transmission timings indicated by the communication situation information. However, among a plurality of transmission timings (determined to have good communication situations) which are indicated by the communication situation information, there is variation among the communication situations, and a transmission timing with a better communication situation may be present.

For the above-described reason, a terminal station 3c of a wireless communication system 1c according to the present embodiment performs transmission of a plurality of test signals to a mobile relay station 2c at shorter intervals than at the time of initial test transmission. The terminal station 3c executes a process (hereinafter referred to as a "narrowing process") of narrowing transmission timings to ones with better communication situations by receiving communication situation information for the transmission of the plurality of test signals again from the mobile relay station 2c. With this configuration, the wireless communication system 1c according to the present embodiment can determine, for each terminal station 3, a transmission execution timing with an even better communication situation as compared to the wireless communication system 1 according to the first embodiment.

A description will be given below with a focus on differences from the first embodiment.

Figure 12:
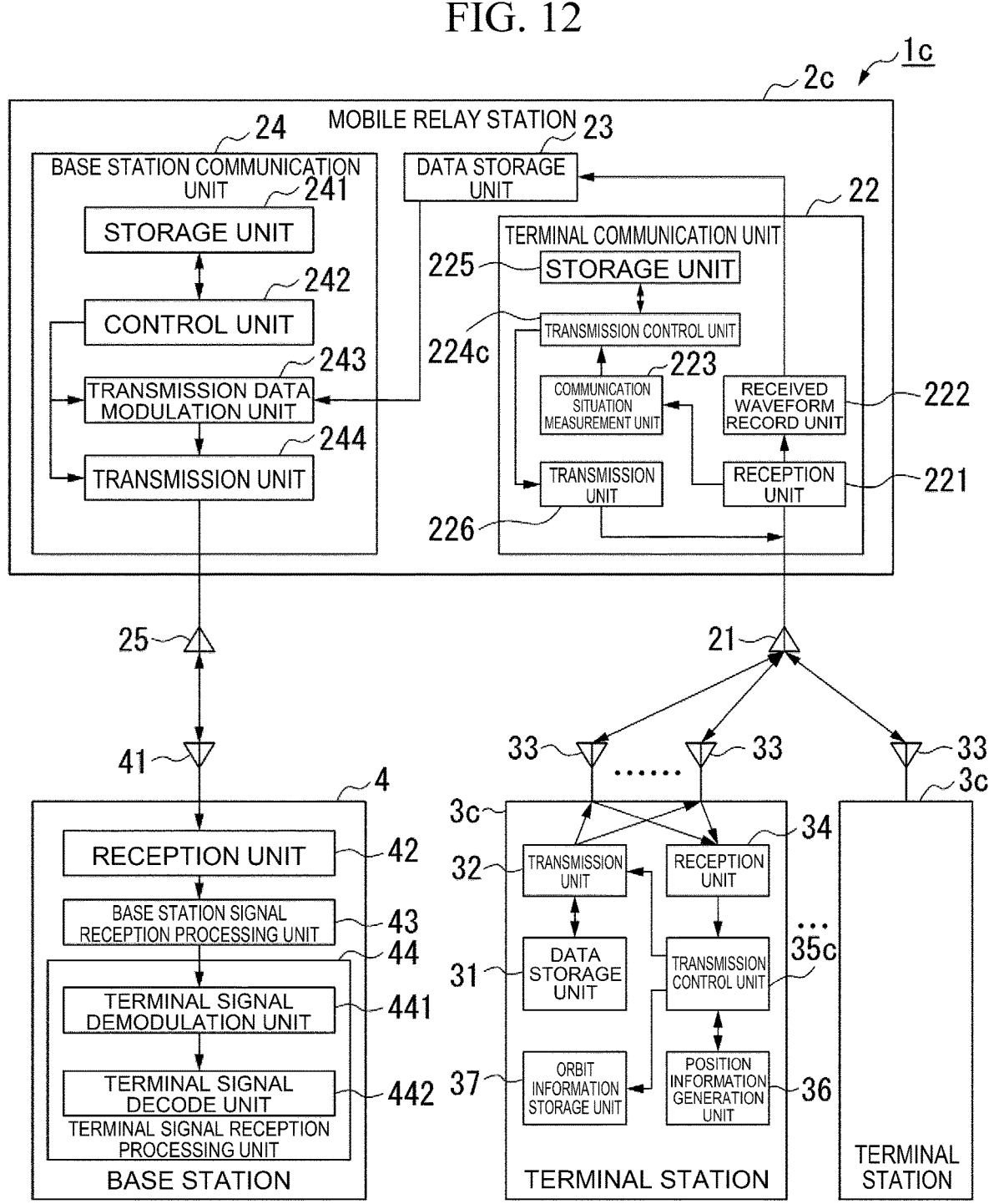
FIG. 12 is a diagram of a configuration of a wireless communication system according to a second embodiment of the present invention.

FIG. 12 is a diagram of a configuration of the wireless communication system 1c according to the second embodiment. In FIG. 12, the same components as in the wireless communication system 1 according to the first embodiment shown in FIG. 1 are denoted by the same reference numerals, and a description thereof will be omitted. The wireless communication system 1c has the mobile relay station 2c (relay apparatus), the terminal station 3c (communication apparatus), and a base station 4. The respective numbers of mobile relay stations 2c, terminal stations 3c, and base stations 4 which the wireless communication system 1c has are arbitrary. The number of terminal stations 3c is assumed to be large. The wireless communication system 1c is a communication system which performs transmission of information not requiring immediacy. Respective pieces of information transmitted from a plurality of terminal stations 3c are transmitted via the mobile relay station 2c and are collected by the base station 4.

As shown in FIG. 12, a configuration of the mobile relay station 2c according to the present embodiment is different from the configuration of the aforementioned mobile relay station 2 according to the first embodiment in that the transmission control unit 224 is replaced with a transmission control unit 224c (relay device controller). A configuration of the terminal station 3c according to the present embodiment is different from the configuration of the aforementioned terminal station 3 according to the first embodiment in that the transmission control unit 35 is replaced with a transmission control unit 35c (communication device controller). Configurations of the transmission control unit 35c and the transmission control unit 224c according to the present embodiment are different from the configurations of the transmission control unit 35 and the transmission control unit 224 according to the first embodiment only in the aforementioned transmission execution timing determination process. A description will be given below with a focus on configurations of the transmission control unit 35c and the transmission control unit 224c in a transmission execution timing determination process.

The configuration of the transmission control unit 35c of the terminal station 3c will be described below.

Figure 13:
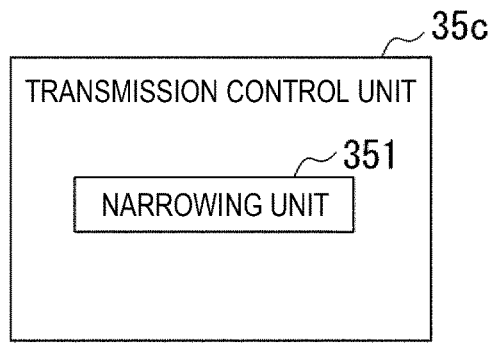
FIG. 13 is a block diagram showing a configuration of a transmission control unit of a terminal station according to the embodiment.

FIG. 13 is a block diagram showing the configuration of the transmission control unit 35c of the terminal station 3c according to the second embodiment. The transmission control unit 35c calculates a communication-enabled time frame when communication with the mobile relay station 2c is possible on the basis of orbit information stored in an orbit information storage unit 37 and position information indicating a position of the terminal station 3c generated by a position information generation unit 36. The transmission control unit 35c detects that a current time has reached the communication-enabled time frame. The transmission control unit 35c controls a transmission unit 32 (communication device transmitter) and causes the transmission unit 32 to transmit a test signal toward the mobile relay station 2 at predetermined intervals (e.g., every one minute) during the calculated communication-enabled time frame. The transmission unit 32 wirelessly transmits a signal from an antenna 33.

The transmission control unit 35c acquires communication situation information from a terminal downlink signal received by a reception unit 34 (communication device receiver). A narrowing unit 351 of the transmission control unit 35c identifies a time frame (hereinafter referred to as a "primary narrowed time frame") which is determined by the mobile relay station 2c to have a good communication situation on the basis of the acquired communication situation information. The primary narrowed time frame is a time frame included in a communication-enabled time frame as described earlier.

The narrowing unit 351 compares a length of the primary narrowed time frame with a length of a target narrowed time period Ts which is a predetermined threshold. The target narrowed time period Ts is a value determined in advance. If the length of the primary narrowed time frame is less than the length of the target narrowed time period Ts, the narrowing unit 351 determines a transmission execution timing to execute transmission of a terminal uplink signal to the mobile relay station 2c within the primary narrowed time frame. After that, the transmission control unit 35c controls the transmission unit 32 such that the transmission unit 32 transmits a terminal uplink signal to the mobile relay station 2c at the determined transmission execution timing each time the mobile relay station 2c makes an orbital revolution.

On the other hand, if the length of the primary narrowed time frame is not less than the length of the target narrowed time period Ts, the narrowing unit 351 transmits a test signal toward the mobile relay station 2c a plurality of times at intervals (e.g., every 30 seconds) shorter than at the time of first transmission of test signals during the primary narrowed time frame. The transmission unit 32 wirelessly transmits a test signal from the antenna 33.

The transmission control unit 35c acquires identification information from a terminal downlink signal received by the reception unit 34. If the acquired identification information is identification information for identification of the terminal station 3 (i.e., if the terminal downlink signal is a terminal downlink signal transmitted to the terminal station 3), the transmission control unit 35c acquires communication situation information from the terminal downlink signal. The narrowing unit 351 of the transmission control unit 35c identifies a time frame (hereinafter referred to as a "secondary narrowed time frame") which is determined by the mobile relay station 2c to have a better communication situation on the basis of the acquired communication situation information. The secondary narrowed time frame is a time frame included in the aforementioned primary narrowed time frame.

The narrowing unit 351 compares a length of the secondary narrowed time frame with the length of the target narrowed time period Ts. If the length of the secondary narrowed time frame is not more than the length of the target narrowed time period Ts, the narrowing unit 351 determines a transmission execution timing to execute transmission of a terminal uplink signal to the mobile relay station 2c within the secondary narrowed time frame. After that, the transmission control unit 35c controls the transmission unit 32 such that the transmission unit 32 transmits a terminal uplink signal to the mobile relay station 2c at the determined transmission execution timing each time the mobile relay station 2c makes an orbital revolution.

On the other hand, if the length of the secondary narrowed time frame is not less than the length of the target narrowed time period Ts, the narrowing unit 351 transmits a test signal toward the mobile relay station 2c a plurality of times at intervals (e.g., every 15 seconds) shorter than at the time of second transmission of test signals during the secondary narrowed time frame. The transmission unit 32 wirelessly transmits a test signal from the antenna 33.

As described above, the narrowing unit 351 repeats transmission of test signals to the mobile relay station 2 until a length of a time frame (an nth-order (n=1, 2 . . . ) narrowed time frame described above) with a good communication situation indicated by acquired communication situation information is less than the length of the target narrowed time period Ts. With this repetition, narrowing to a time frame with a better communication situation is performed.

The configuration of the transmission control unit 224c of the mobile relay station 2c will be described.

Figure 14:
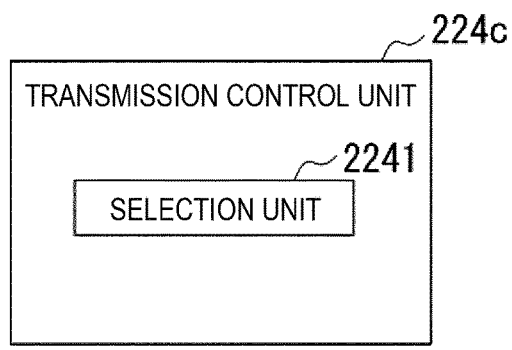
FIG. 14 is a block diagram showing a configuration of a transmission control unit of a mobile relay station according to the embodiment.

FIG. 14 is a block diagram showing the configuration of the transmission control unit 224c of the mobile relay station 2c according to the second embodiment. A selection unit 2241 of the transmission control unit 224c acquires congestion degree information which is output from a communication situation measurement unit 223 (indicator). The selection unit 2241 temporarily records the acquired congestion degree information on a storage medium, such as a storage unit 225. Respective pieces of congestion degree information at the time of reception of a plurality of test signals transmitted from the single terminal station 3 are recorded on the storage medium.

The selection unit 2241 selects congestion degree information with a lower congestion degree from among a plurality of pieces of congestion degree information recorded on the storage medium. For example, the selection unit 2241 selects congestion degree information with a below-average congestion degree. Alternatively, for example, the selection unit 2241 selects a predetermined number of (e.g., three) pieces of congestion degree information with the lowest congestion degrees. The transmission control unit 224c uses a result of the selection as a communication information determination result.

Note that, for example, the selection unit 2241 may be configured to determine that a communication situation is good if RSSI is not less than a predetermined threshold and determine that the communication situation is poor if the RSSI is less than the predetermined threshold, as in the first embodiment. In this case, the selection unit 2241 uses a different threshold in accordance with the number of repetitions of test signal transmission. That is, for example, the selection unit 2241 uses a threshold which makes a communication situation less likely to be determined to be good with increase in the number of repetitions of test signal transmission.

The selection unit 2241 generates communication situation information in which information indicating a determination result, reception times of test signals included in acquired pieces of congestion degree information, and the identification information for identification of the terminal station 3 are associated and records the communication situation information in the storage unit 225. The transmission control unit 224c outputs the generated communication situation information to the transmission unit 226 (relay device transmitter), for example, in a next orbital revolution.

Figure 15:
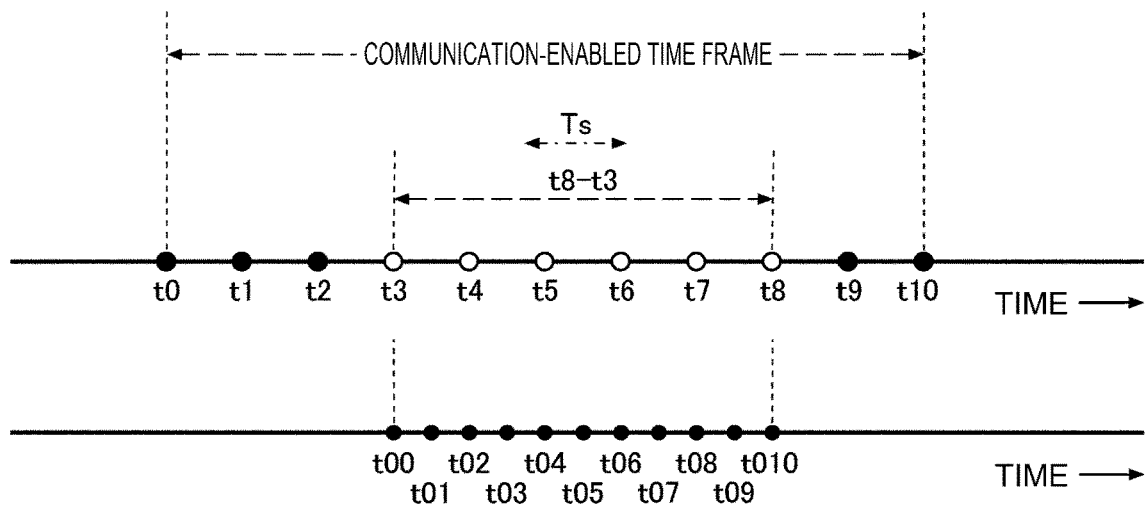
FIG. 15 is a schematic chart showing an example of a narrowing process by the wireless communication system according to the embodiment.
Figure 16:
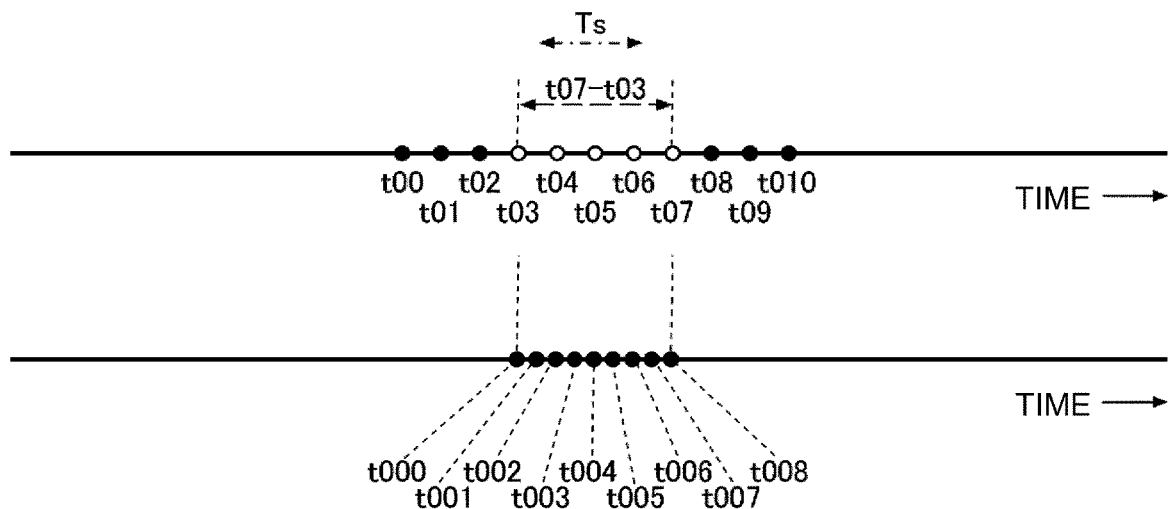
FIG. 16 is a schematic chart showing the example of the narrowing process by the wireless communication system according to the embodiment.
Figure 17:
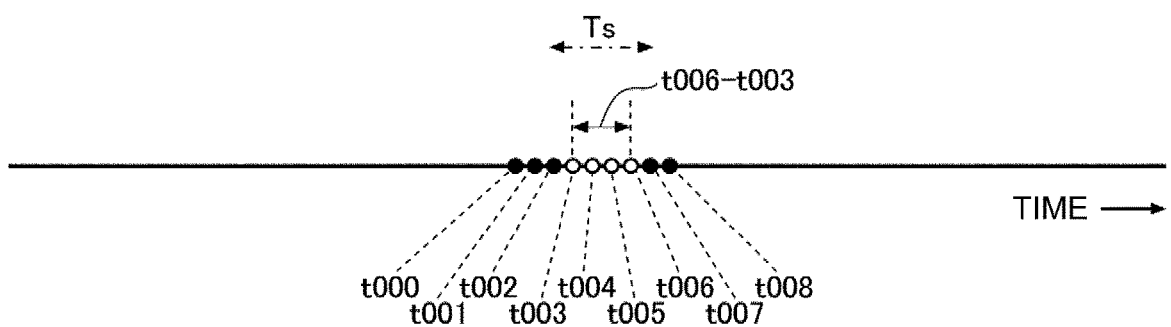
FIG. 17 is a schematic chart showing the example of the narrowing process by the wireless communication system according to the embodiment.

FIGS. 15 to 17 are charts for explaining an example of a narrowing process by the wireless communication system 1c according to the second embodiment.

Times t0 to t10 shown in FIG. 15 correspond to the times t0 to t10 shown in FIG. 3 described earlier. As in FIG. 3, a white circle indicates a transmission timing which is determined to have a good communication situation while a black circle indicates a transmission timing which is determined to have a poor communication situation. That is, FIG. 15 indicates that a communication situation is determined to be good in reception of each of six test signals transmitted at the times t3 to t8 of a total of 11 test signals received by the mobile relay station 2c from the time t0 to the time t10.

The terminal station 3c sets a time frame from the time t3 to the time t8 as the primary narrowed time frame as described earlier. The terminal station 3c compares the length (t8−t3) of the primary narrowed time frame with the length of the target narrowed time frame Ts. As shown in FIG. 15, since the length of the primary narrowed time frame is not less than the length of the target narrowed time frame Ts, the terminal station 3c performs test signal transmission to the mobile relay station 2c again at transmission intervals (times t00, t01, t02, t010) even shorter than the transmission intervals (the times t0, t1, t2, t10) at the time of the initial test signal transmission.

FIG. 16 indicates that a communication situation is determined to be good in reception of each of five test signals transmitted at the times t03 to t07 of a total of 11 test signals received by the mobile relay station 2c from the time t00 to the time t010.

The terminal station 3c sets a time frame from the time t03 to the time t07 as the secondary narrowed time frame as described earlier. The terminal station 3c compares the length (t07-t03) of the secondary narrowed time frame with the length of the target narrowed time frame Ts. As shown in FIG. 16, since the length of the secondary narrowed time frame is not less than the length of the target narrowed time frame Ts, the terminal station 3c performs test signal transmission to the mobile relay station 2c again at transmission intervals (times t000, t001, t002, t008) even shorter than the transmission intervals (the times t00, t01, t02, t010) at the time of the second test signal transmission.

FIG. 17 indicates that a communication situation is determined to be good in reception of each of four test signals transmitted at the times t003 to t006 of a total of nine test signals received by the mobile relay station 2c from the time t000 to the time t008.

The terminal station 3c sets a time frame from the time t003 to the time t004 as a tertiary narrowed time frame. The terminal station 3c compares a length (t006-t003) of the tertiary narrowed time frame with the length of the target narrowed time frame Ts. As shown in FIG. 17, the length of the tertiary narrowed time frame is less than the length of the target narrowed time frame Ts. Thus, the terminal station 3c determines a transmission execution timing to execute transmission of a terminal uplink signal to the mobile relay station 2c within the tertiary narrowed time frame (the times t003 to t006). After that, the transmission control unit 35c controls the transmission unit 32 such that the transmission unit 32 transmits a terminal uplink signal having terminal transmission data, such as environmental data, set therein to the mobile relay station 2c at the determined transmission execution timing each time the mobile relay station 2c makes an orbital revolution.

Figure 18:
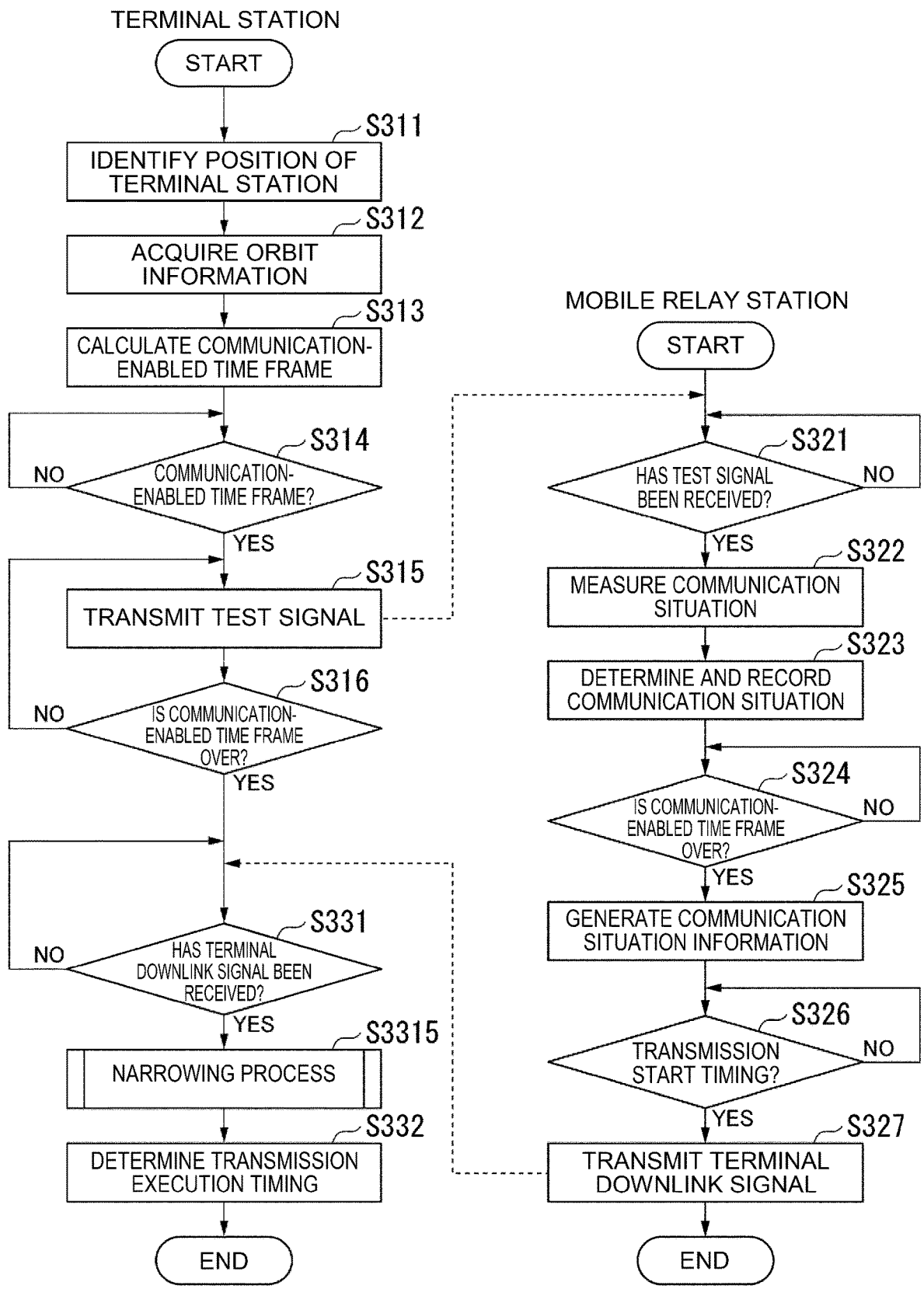
FIG. 18 is a flowchart showing a transmission timing determination process of the wireless communication system according to the embodiment.

FIG. 18 is a flowchart showing the transmission execution timing determination process by the wireless communication system 1c. The transmission execution timing determination process indicated by the flowchart in FIG. 18 is started, for example, at the time of initial activation of the wireless communication system 1 or at the time of initial activation of the terminal station 3. In FIG. 18, the same processes as in the processing flow according to the first embodiment shown in FIG. 6 are denoted by the same reference characters. The transmission execution timing determination process indicated by the flowchart in FIG. 18 is different from the processing flow according to the first embodiment shown in FIG. 6 in that a process in step S3315 corresponding to the aforementioned narrowing process is added between step S331 and step S332.

Figure 19:
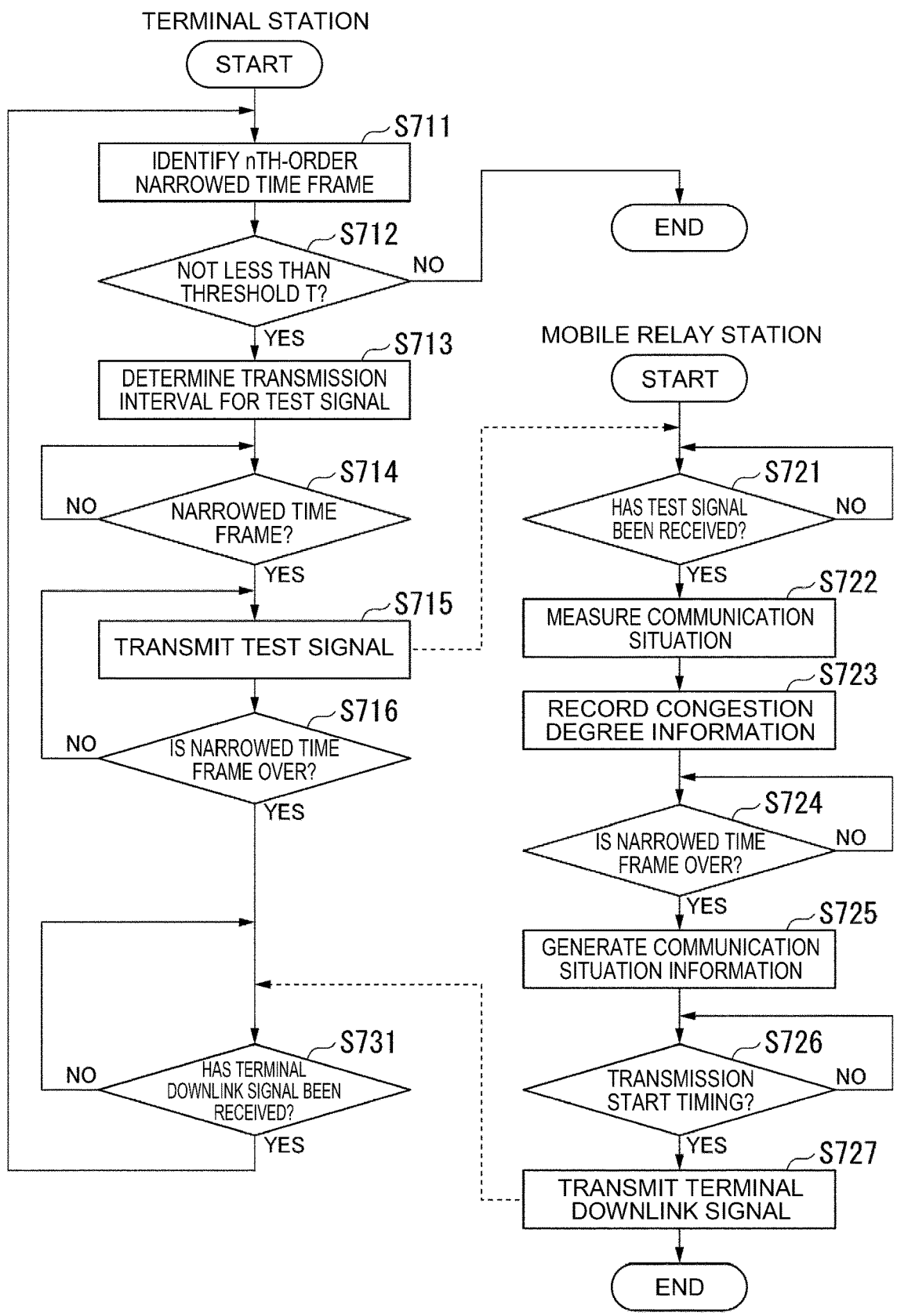
FIG. 19 is a flowchart of the narrowing process of the wireless communication system according to the embodiment.

FIG. 19 is a flowchart showing the narrowing process by the wireless communication system 1c. As described earlier, the flowchart in FIG. 19 corresponds to the process in step S3315 of FIG. 18.

The narrowing unit 351 of the transmission control unit 35c identifies a primary narrowed time frame indicating a time frame which is determined by the mobile relay station 2c to have a good communication situation on the basis of acquired communication situation information (step S711). The narrowing unit 351 compares a length of the primary narrowed time frame with the length of the target narrowed time period Ts that is the predetermined threshold (step S712). If the length of the primary narrowed time frame is less than the length of the target narrowed time period Ts (NO in step S712), the narrowing process indicated by the flowchart in FIG. 19 ends.

On the other hand, if the length of the primary narrowed time frame is not less than the length of the target narrowed time period Ts (YES in step S712), the narrowing unit 351 determines a transmission interval for test signals (step S713). As described earlier, the narrowing unit 351 determines the transmission interval such that the transmission interval is a transmission interval shorter than a test signal transmission interval used last time.

The narrowing unit 351 waits until a start time of the narrowed time frame comes (step S714). If the start time of the narrowed time frame comes (YES in step S714), the narrowing unit 351 causes test signal transmission to the mobile relay station 2c to start. The narrowing unit 351 causes repeated transmission of a test signal at the determined transmission interval shorter than that used last time. The transmission unit 32 wirelessly transmits a test signal from the antenna 33. If the narrowed time frame ends (step S716), the narrowing unit 351 waits again.

If the communication situation measurement unit 223 of the mobile relay station 2 receives a test signal transmitted from the terminal station 3 (YES in step S721), the communication situation measurement unit 223 measures a communication situation in a reception unit 221 (relay device receiver) (step S722). The communication situation measurement unit 223 generates congestion degree information on the basis of a measurement result and outputs the congestion degree information. The selection unit 2241 of the transmission control unit 224c acquires the congestion degree information output from the communication situation measurement unit 223. The selection unit 2241 temporarily records the acquired congestion degree information on the storage medium, such as the storage unit 225. Respective pieces of congestion degree information at the time of reception of a plurality of test signals transmitted from the single terminal station 3 are recorded on the storage medium.

If the narrowed time frame ends (YES in step S724), the selection unit 2241 selects congestion degree information with a lower congestion degree from among the plurality of pieces of congestion degree information recorded on the storage medium. The transmission control unit 224c regards a result of the selection as a communication information determination result. The selection unit 2241 generates communication situation information in which information indicating the determination result, reception times of test signal included in acquired pieces of congestion degree information, and the identification information for identification of the terminal station 3 are associated (step S725).

If a next transmission timing comes (step S726), the transmission control unit 224c outputs the generated communication situation information to the transmission unit 226. The transmission unit 226 transmits a terminal downlink signal having the acquired communication situation information set therein toward the ground (step S727).

If the reception unit 34 of the terminal station 3c receives the terminal downlink signal (YES in step S731), the processes in step S711 and subsequent steps are repeated again.

As has been described above, the terminal station 3c of the wireless communication system 1c according to the second embodiment performs transmission of a plurality of test signals to the mobile relay station 2c at even shorter intervals on the basis of acquired communication situation information. The terminal station 3c executes the narrowing process of narrowing transmission timings to ones with better communication situations by receiving communication situation information for the transmission of the plurality of test signals from the mobile relay station 2c again. With this configuration, the wireless communication system 1c according to the present embodiment can determine, for each terminal station 3, a transmission execution timing with an even better communication situation as compared to the wireless communication system 1 according to the first embodiment.

Note that the present embodiment is configured so as to determine, on the basis of a result of comparing a length of an obtained narrowed time frame with the length of the target narrowed time period Ts that is a threshold, whether to continue the narrowing process any further. Note that the present invention is not limited to this configuration and that, for example, a configuration which makes a determination as to whether to continue the narrowing process any further in accordance with to which the number of transmission timings with good communication situations has been narrowed may be adopted. Alternatively, a configuration in which the narrowing process is performed times, the number of which is determined in advance, may be adopted.

According to the embodiments and modifications, in a wireless communication system, a relay device provided on a mobile object communicates wirelessly with a plurality of communication devices present in places different from each other. For example, the relay device is the mobile relay station 2, 2a, 2b, or 2c in each embodiment, and the communication devices are the terminal stations 3 or 3c in the embodiment.

Each communication device includes a communication device transmission unit, a communication device reception unit, and a communication device control unit. For example, the communication device transmission unit is the transmission unit 32 and the antenna 33 in each embodiment, the communication device reception unit is the reception unit 34 and the antenna 33 in the embodiment, and the communication device control unit is the transmission control unit 35 or 35c in the embodiment.

The communication device transmission unit transmits test signals at plurality of timings during a time frame when communication with the relay device is possible. Examples of the time frame when communication with the relay device is possible are a communication-enabled time frame and a narrowed time frame in each embodiment, and the timings are each a transmission timing in the embodiment. The communication device reception unit receives, from the relay device, communication situation information indicating respective communication situations with the relay device at the plurality of timings. The communication device control unit identifies one, the communication situation of which is good, among the plurality of timings on the basis of the communication situation information and controls the communication device transmission unit such that the communication device transmission unit communicates with the relay device at the identified timing with the good communication situation. For example, the timing with the good communication situation for communication with the relay device is a transmission execution timing in each embodiment. For example, the communication with the relay device is communication related to transmission of a terminal uplink signal having terminal transmission data, such as environmental data, set therein in the embodiment.

The relay device includes a relay device reception unit, a measurement unit, a relay device control unit, and a relay device transmission unit. For example, the relay device reception unit is the reception unit 221, the reception unit 221b, or the reception units 221b-1 to 221b-N and the antenna 21 or the antennas 21-1 to 21-N in each embodiment, the measurement unit is the communication situation measurement unit 223 or 223b in the embodiment, the relay device control unit is the transmission control unit 224, 224b, or 224c in the embodiment, and the relay device transmission unit is the transmission unit 226 or 226b and the antenna 21 or the antennas 21-1 to 21-N in the embodiment.

The relay device reception unit receives the respective test signals transmitted from the communication device at the plurality of timings. The measurement unit measures the respective communication situations at the time of reception of the test signals at the plurality of timings by the relay device reception unit. The relay device control unit generates the communication situation information on the basis of the communication situations measured by the measurement unit. The relay device transmission unit transmits the communication situation information to the communication device during a time frame when communication with the communication device is possible. Examples of the time frame when communication with the communication device is possible are the communication-enabled time frame and the narrowed time frame in each embodiment.

Note that the communication device transmission unit may transmit the test signals again at a plurality of timings at shorter intervals during a partial time frame of the time frame when communication with the relay device is possible, on the basis of the communication situation information. For example, the partial time frame of the time frame when communication with the relay device is possible is a (an nth-order) narrowed time frame included in the communication-enabled time frame in each embodiment.

Note that although a case where a mobile object on which a mobile relay station is mounted is a LEO satellite has been described in each of the first and second embodiments and modifications, the mobile object may be any other flying object that flies in the sky, such as a geostationary satellite, a drone, or a HAPS.

A part of the mobile relay stations 2, 2a, 2b, and 2c, the terminal stations 3 and 3c, and the base stations 4, 4a, and 4b in the above-described embodiments may be implemented by a computer. In this case, the implementation may be achieved by recording a program for implementing a function of the part on a computer-readable recording medium, loading the program recorded on the recording medium into a computer system, and executing the program. Note that the computer system here is assumed to include an OS and hardware, such as peripheral equipment. The computer-readable recording medium refers to a portable medium, such as a flexible disk, a magneto-optical disk, a ROM, or a CD-ROM or a storage device, such as a hard disk built in the computer system. Additionally, the computer-readable recording medium may include one which dynamically holds a program for a short time period, such as a communication wire in a case where a program is transmitted via a network, such as the Internet, or a communication line, such as a phone line, and one which holds a program for a fixed time period, such as a volatile memory inside the computer system serving as a server or a client in the case. The program may be one for implementing a part of the aforementioned function, one which can implement the function by being combined with a program already recorded in the computer system, or one which is implemented using a programmable logic device, such as an FPGA (Field Programmable Gate Array).

The embodiments of this invention have been described in detail with reference to the drawings. Specific configurations are not limited to those of these embodiments, and a design and the like within the scope of the invention are also included.

REFERENCE SIGNS LIST 1, 1a, 1b, 1c Wireless communication system
2, 2a, 2b, 2c Mobile relay station
3, 3c Terminal station
4, 4a, 4b Base station
21, 21-1 to 21-N Antenna
22, 22b, 22c, 22d Terminal communication unit
23 Data storage unit
24 Base station communication unit
25 Antenna
26 Base station communication unit
27 Inter-relay-station communication unit
28 Antenna
31 Data storage unit
32 Transmission unit
33 Antenna
34 Reception unit
35, 35c Transmission control unit
36 Position information generation unit
41 Antenna
42 Reception unit 43 Base station signal reception processing unit
44 Terminal signal reception processing unit
221, 221b, 221b-1 to 221b-N Reception unit
222, 222b, 222b-1 to 222b-N Received waveform record unit
223, 223b Communication situation measurement unit
224, 224b, 224c Transmission control unit
225 Storage unit
226, 226b Transmission unit
241 Storage unit
242 Control unit
243 Transmission data modulation unit
244 Transmission unit
261 Storage unit
262 Control unit
263 Transmission data modulation unit
264 MIMO transmission unit
351 Narrowing unit
410 Antenna station
420 MIMO reception unit
430 Base station signal reception processing unit
441 Terminal signal demodulation unit
442 Terminal signal decode unit
450 Terminal signal reception processing unit
451 Distribution unit
452, 452-1 to 451-N Terminal signal demodulation unit
453 Synthesis unit
454 Terminal signal decode unit
2241 Selection unit

The invention claimed is:

1. A wireless communication system in which a relay device provided on a mobile object communicates wirelessly with a plurality of communication devices present in places different from each other,
wherein each of the communication devices includes
a communication device transmitter which transmits test signals at a plurality of timings during a time frame when communication with the relay device is possible,
a communication device receiver which receives, from the relay device, communication situation information indicating respective communication situations with the relay device at the plurality of timings, and
a communication device controller which identifies one, the communication situation of which is good, among the plurality of timings on the basis of the communication situation information and controls the communication device transmitter such that the communication device transmitter communicates with the relay device at the identified timing with the good communication situation, and
the relay device includes
a relay device receiver which receives the respective test signals transmitted from the communication device at the plurality of timings,
an indicator which measures the respective communication situations at the time of reception of the test signals at the plurality of timings by the relay device receiver,
a relay device controller which generates the communication situation information on the basis of the communication situations measured by the indicator, and
a relay device transmitter which transmits the communication situation information to the communication device during a time frame when communication with the communication device is possible.

2. The wireless communication system according to claim 1, wherein
the communication device transmitter transmits the test signals again at a plurality of timings at shorter intervals during a partial time frame of the time frame when communication with the relay device is possible, on the basis of the communication situation information.

3. A communication timing determination method in a wireless communication system in which a relay device provided on a mobile object communicates wirelessly with a plurality of communication devices present in places different from each other, comprising:
by each of the communication devices, transmitting test signals at a plurality of timings during a time frame when communication with the relay device is possible;
by the relay device, receiving the respective test signals transmitted from the communication device at the plurality of timings;
by the relay device, measuring respective communication situations at the time of reception of the test signals at the plurality of timings;
by the relay device, generating communication situation information indicating the respective communication situations with the relay device at the plurality of timings on the basis of the communication situations;
by the relay device, transmitting the communication situation information to the communication device during a time frame when communication with the communication device is possible;
by the communication device, receiving the communication situation information; and
by the communication device, identifying one, the communication situation of which is good, among the plurality of timings on the basis of the communication situation information and controlling a communication device transmitter such that the communication device transmitter communicates with the relay device at the identified timing with the good communication situation.

* * * * *